(12) United States Patent
Shibata et al.

(10) Patent No.: US 10,409,847 B2
(45) Date of Patent: Sep. 10, 2019

(54) COMPUTER-READABLE RECORDING MEDIUM, LEARNING METHOD, AND MAIL SERVER

(71) Applicant: FUJITSU LIMITED, Kawasaki-shi, Kanagawa (JP)

(72) Inventors: Ryu Shibata, Fuji (JP); Tomotsugu Mochizuki, Shizuoka (JP); Norikatsu Nishizawa, Shizuoka (JP); Satoshi Kasai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 15/345,683

(22) Filed: Nov. 8, 2016

(65) Prior Publication Data
US 2017/0161369 A1 Jun. 8, 2017

(30) Foreign Application Priority Data
Dec. 4, 2015 (JP) .................................. 2015-237998

(51) Int. Cl.
*G06F 21/55* (2013.01)
*G06Q 10/10* (2012.01)
*H04L 12/58* (2006.01)
*G06F 16/35* (2019.01)
*G06F 16/338* (2019.01)

(52) U.S. Cl.
CPC ............ *G06F 16/338* (2019.01); *G06F 16/35* (2019.01); *G06F 21/552* (2013.01); *G06Q 10/107* (2013.01); *H04L 51/12* (2013.01)

(58) Field of Classification Search
CPC ......... G06F 17/30696; G06F 17/30705; G06F 21/00; G06F 16/338; G06F 16/35; G06F 21/552; G06Q 10/10; G06Q 10/107; H04L 51/00; H04L 51/12
See application file for complete search history.

(56) References Cited

U.S. PATENT DOCUMENTS

| | | | |
|---|---|---|---|
| 6,836,772 B1 | 12/2004 | Nishimura | |
| 2001/0044795 A1* | 11/2001 | Cohen | ............... G06F 17/30699 |
| 2003/0037034 A1* | 2/2003 | Daniels | ............... G06Q 10/087 |
| 2004/0083224 A1 | 4/2004 | Yoshida | |
| 2005/0055357 A1* | 3/2005 | Campbell | ................. G06F 8/61 |

(Continued)

FOREIGN PATENT DOCUMENTS

| | | |
|---|---|---|
| JP | 2000-132553 | 5/2000 |
| JP | 2004-21605 A | 1/2004 |

(Continued)

OTHER PUBLICATIONS

Japanese Office Action dated Jul. 30, 2019 for corresponding Japanese Patent Application No. 2015-237998, with English Translation, 7 pages.

*Primary Examiner* — Jay A Morrison
(74) *Attorney, Agent, or Firm* — Fujitsu Patent Center

(57) ABSTRACT

A mail server identifies first keyword set including a keyword that is not included in a second keyword set, the key word being a keyword that appear in mail data with a frequency higher than a predetermined frequency, the mail data being extracted based on the second keyword set including a keyword used in extraction conditions of the mail data. Then, the mail server adds the first keyword set to the extraction conditions of the mail data.

8 Claims, 20 Drawing Sheets

(56) References Cited

U.S. PATENT DOCUMENTS

| | | | |
|---|---|---|---|
| 2009/0043860 A1* | 2/2009 | Aoki | G06Q 10/107 709/206 |
| 2010/0074424 A1* | 3/2010 | Ito | H04M 15/00 379/142.04 |
| 2011/0040559 A1* | 2/2011 | Kim | G10L 15/265 704/231 |
| 2013/0238319 A1* | 9/2013 | Minegishi | G06F 11/3072 704/9 |
| 2014/0031068 A1* | 1/2014 | Yamada | G06Q 30/02 455/456.3 |
| 2015/0180746 A1* | 6/2015 | Day, II | H04L 51/16 455/405 |
| 2016/0380936 A1* | 12/2016 | Gunasekara | G06Q 10/107 709/206 |

FOREIGN PATENT DOCUMENTS

| | | |
|---|---|---|
| JP | 2004-139222 A | 5/2004 |
| JP | 2005-284454 | 10/2005 |
| JP | 2007-249584 | 9/2007 |
| JP | 2012-3560 A | 1/2012 |

* cited by examiner

FIG.3

| CATEGORY | APPLICABLE KW | EXCLUDABLE KW | NG-KW |
|---|---|---|---|
| INFORMATION LEAKAGE | BUSINESS CONNECTION, CONFIDENTIALITY, ⋯ | ESTIMATE, ⋯ | TRADE SECRET, ⋯ |
| SLANDER | DIE, FOOL, IDIOT, TRASH, STUPID ⋯ | APPLE, ⋯ | SCUM, ⋯ |
| ABUSE OF POWER | QUOTA, FOOL, ⋯ | SALARY | GOLDBRICKER, ⋯ |
| SEXUAL HARASSMENT | BEAUTIFUL, PREGNANT, MARRIAGE, ⋯ | CELEBRATION, ⋯ | UGLY, ⋯ |

FIG.4

| <MAIL 1> FOOL, BANANA, ORANGE | <MAIL 6> IDIOT, BANANA | <MAIL 11> IDIOT, ORANGE | <MAIL 16> FOOL, APPLE |
| --- | --- | --- | --- |
| <MAIL 2> FOOL, BANANA, ORANGE | <MAIL 7> IDIOT, BANANA, BANANA | <MAIL 12> IDIOT, ORANGE | <MAIL 17> FOOL, APPLE, APPLE |
| <MAIL 3> FOOL, BANANA, ORANGE | <MAIL 8> IDIOT, BANANA | <MAIL 13> IDIOT, ORANGE | <MAIL 18> FOOL, APPLE, APPLE |
| <MAIL 4> FOOL, BANANA, ORANGE | <MAIL 9> IDIOT, BANANA, BANANA | <MAIL 14> IDIOT, ORANGE, APPLE | <MAIL 19> FOOL, APPLE, APPLE |
| <MAIL 5> FOOL, BANANA, ORANGE | <MAIL 10> IDIOT, BANANA | <MAIL 15> IDIOT, APPLE | <MAIL 20> FOOL, APPLE |

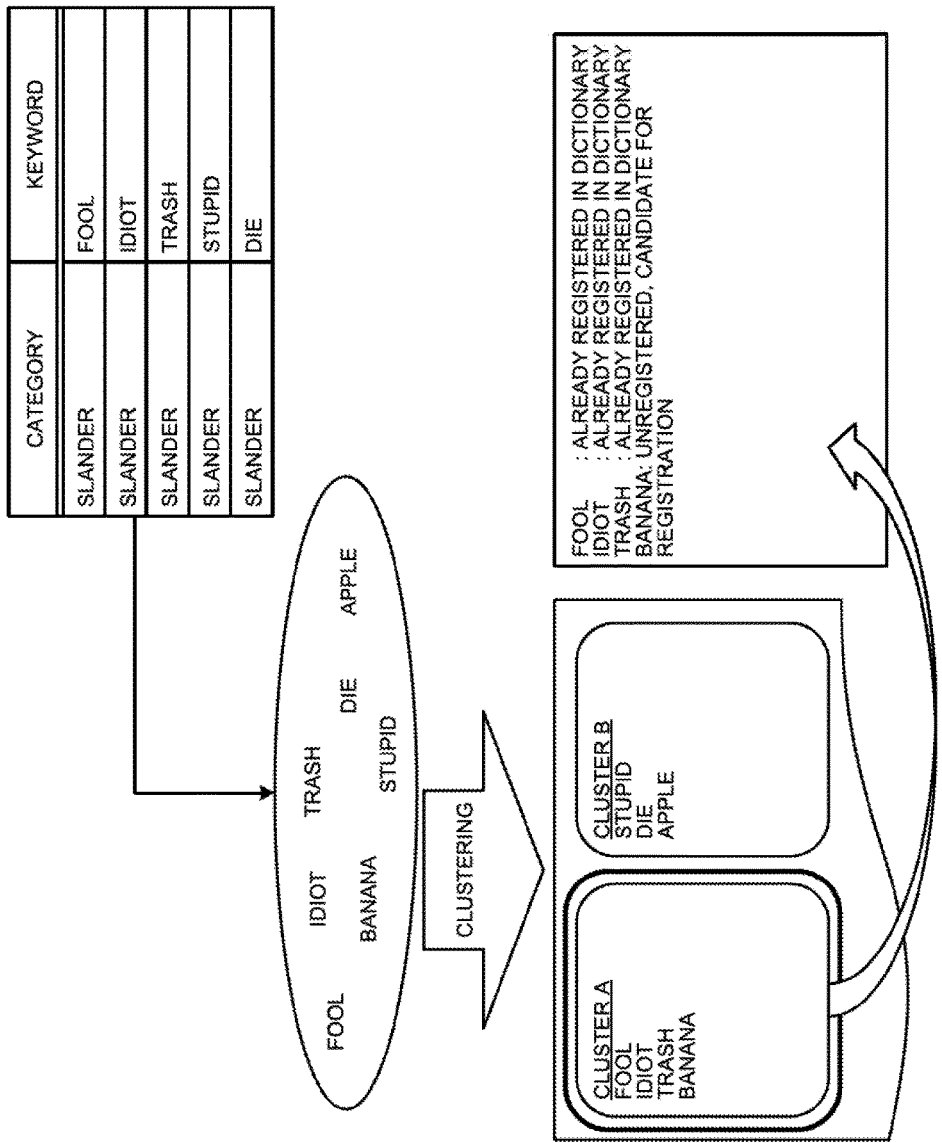

FIG.7

| CATEGORY | APPLICABLE KW | NUMBER OF EXTRACTIONS | DEFAULT |
|---|---|---|---|
| SLANDER | YOU | 20 | |
| | DIE | 35 | YES |
| | FOOL | 9 | YES |
| | IDIOT | 2 | |
| | TRASH | 16 | YES |

⬇ — DELETION

| CATEGORY | APPLICABLE KW | EXCLUDABLE KW | NG-KW |
|---|---|---|---|
| SLANDER | YOU, DIE, FOOL, IDIOT, TRASH, STUPID… | APPLE, … | SCUM, … |

FIG.12

| RISK LEVEL | CONDITIONS FOR DETERMINATION |
|---|---|
| RISK 5 | RATE OF POINTS IN LATEST WEEK (WEEK OF DETERMINATION) IS 1.5 OR MORE |
| | RATES OF POINTS IN LAST FOUR WEEKS ARE ALL 1.4 OR MORE |
| RISK 4 | TOTAL VALUE OF RATES OF POINTS IN LAST FOUR WEEKS IS 4.2 OR MORE |
| | TOTAL VALUE OF RATES OF POINTS IN LAST FOUR WEEKS IS 3.6 OR MORE AND NUMBER OF CATEGORIES IS TWO OR MORE |
| | RATE OF POINTS IN LATEST WEEK (WEEK OF DETERMINATION) IS 1.0 OR MORE |
| | RATES OF POINTS IN LAST FOUR WEEKS ARE ALL 0.8 OR MORE |
| RISK 3 | TOTAL VALUE OF RATES OF POINTS IN LAST FOUR WEEKS IS 2.4 OR MORE |
| | TOTAL VALUE OF RATES OF POINTS IN LAST FOUR WEEKS IS 1.8 OR MORE AND NUMBER OF CATEGORIES IS TWO OR MORE |
| | RATE OF POINTS IN LATEST WEEK (WEEK OF DETERMINATION) IS 0.5 OR MORE |
| RISK 2 | TOTAL VALUE OF RATES OF POINTS IN LAST FOUR WEEKS IS 1.2 OR MORE |
| | RATE OF POINTS IN LATEST WEEK (WEEK OF DETERMINATION) IS 0.3 OR MORE |
| RISK 1 | RATE OF POINTS IN LATEST WEEK (WEEK OF DETERMINATION) IS MORE THAN 0.0 |
| | TOTAL VALUE OF RATES OF POINTS IN LAST FOUR WEEKS IS 0.1 OR MORE |

FIG.16

| RISK 5 | RISK 4 | RISK 3 | RISK 2 | RISK 1 |
|---|---|---|---|---|
| | LIST OF SOURCE MAIL ADDRESSES<br>aaaaaaa@bbb.com<br>123@bbb.com<br>456@bbb.com<br>... | LIST OF DESTINATION MAIL ADDRESSES<br>111111@bbb.com<br>222@bbb.com<br>999@aa-bb.co.jp<br>... | | LIST OF SOURCE & DESTINATION<br>aaaaaaa@bbb.com → 111111@bbb.com<br>... |

COMPUTER-READABLE RECORDING MEDIUM, LEARNING METHOD, AND MAIL SERVER

CROSS-REFERENCE TO RELATED APPLICATION

This application is based upon and claims the benefit of priority of the prior Japanese Patent Application No. 2015-237998, filed on Dec. 4, 2015, the entire contents of which are incorporated herein by reference.

FIELD

The embodiments discussed herein are related to a computer-readable recording medium, a learning method, and a mail server.

BACKGROUND

With the permeation of information technology (IT) environment including the Internet, various information is circulated throughout the world.

Furthermore, information circulation using IT is advancing in every scene from business to personal hobbies and avocational activities. Circulating information has a high degree of flexibility, and is diverse in format and content.

There are some kinds of information having various risks; for example, there are information having a risk of becoming a problem in case of leakage of its existence, information having a harmful impact such as an attack or discomfort on a recipient of information circulated, etc. Such information is always circulated in a hidden way through IT. Furthermore, there is a possibility that people unknowingly perform an action which will become a problem; in some cases, such an action may develop into a major problem or a crime before people realize it. Moreover, once information comes into the world, the information is not able to be withdrawn. In this way, circulation of information may damage individual or company's reliability.

Electronic mail (hereinafter, sometimes referred to as "mail") is cited as a technology used for information circulation in a company or the like. In recent years, there is used a technique to register keywords that impact a mail recipient and frequently appearing keywords in advance and extract electronic mails including any of the keywords.

Patent Literature 1: Japanese Laid-open Patent Publication No. 2005-284454
Patent Literature 2: Japanese Laid-open Patent Publication No. 2007-249584
Patent Literature 3: Japanese Laid-open Patent Publication No. 2000-132553

SUMMARY

According to an aspect of an embodiment, a non-transitory computer-readable recording medium stores therein a learning program that causes a computer to execute a process. The process includes identifying first keyword set including a keyword that is not included in a second keyword set, the key word being a keyword that appear in mail data with a frequency higher than a predetermined frequency, the mail data being extracted based on the second keyword set including a keyword used in extraction conditions of the mail data; and adding the first keyword set to the extraction conditions of the mail data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a category DB;
FIG. 4 is a diagram for explaining an example of extraction of a classification keyword using co-occurrence probability;
FIG. 5 is a diagram for explaining an example of extraction of a classification keyword using clustering;
FIG. 7 is a diagram for explaining an example of automatic deletion of a keyword;
FIG. 12 is a diagram for explaining an example of criteria for risk determination;
FIG. 16 is a diagram for explaining a display example of each risk level.

DESCRIPTION OF EMBODIMENTS

Preferred embodiments of the present invention will be explained with reference to accompanying drawings. Incidentally, the technology discussed herein is not limited by these embodiments. The embodiments can be suitably combined within the range not causing any contradiction.

However, the above-mentioned technique is difficult to keep up with changes of the times or changes in keywords used, and is difficult to maintain the accuracy of extracting electronic mails that are at high risk of having a harmful impact.

For example, many of keywords to be registered depend on the subjective view of an administrator or the like, so it is not possible to determine whether those registered are actually used in a high-risk electronic mail. Furthermore, the work to check if the registered keywords are actually used or not needs a lot of time to monitor and examine electronic mails on a daily basis, and causes an increase in work burden on the administrator or the like.

[a] First Embodiment

Overall Configuration

Figure 1:
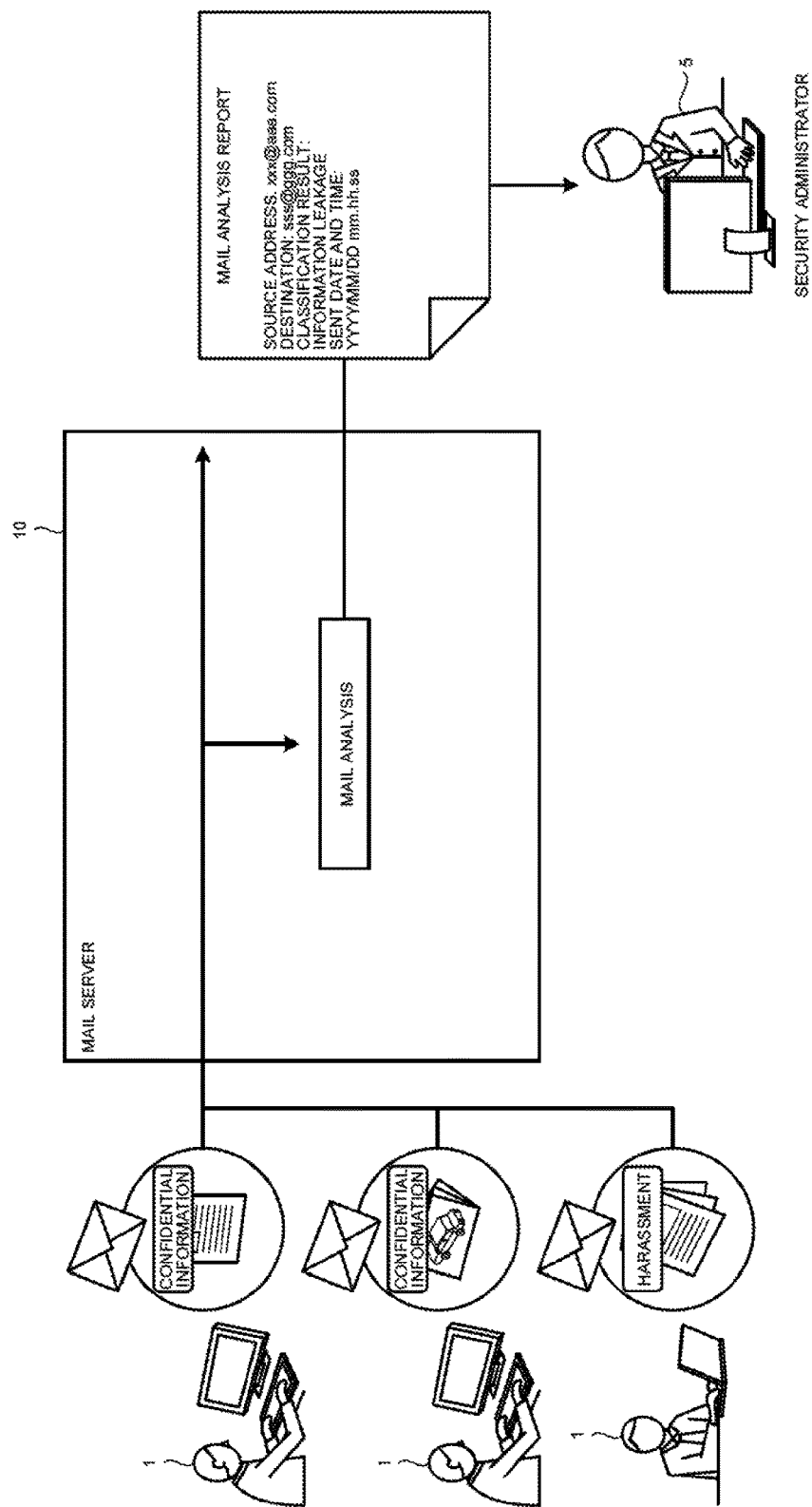
FIG. 1 is a diagram illustrating an overall configuration example of a system according to a first embodiment.

FIG. 1 is a diagram illustrating an overall configuration example of a system according to a first embodiment. As illustrated in FIG. 1, this system is an in-company electronic mail system in which a mail server 10 analyzes electronic mails sent by company employees 1 and notifies a security administrator 5 (hereinafter, sometimes referred to as "administrator") of results of the analysis.

The employees 1 access to the mail server 10 by using electronic equipment such as a cell phone and a personal computer, and send/receive an electronic mail to/from another company employee or a person on the outside. Using the mail server 10, the administrator 5 analyzes electronic mails sent by the employees 1 and electronic mails that the employees 1 receive, and generates a mail analysis report.

The mail server 10 is a server device that provides various processing related to electronic mail, such as creation, sending, and receiving of an electronic mail, to the employees 1. Furthermore, the mail server 10 extracts any electronic mail having a harmful impact such as an attack or discomfort on a mail recipient from outgoing electronic mails sent by the employees 1.

For example, the mail server 10 determines whether an outgoing electronic mail can fall under any of the following categories: information leakage, slander, abuse of power, and sexual harassment. Then, as for an electronic mail that can fall under any of the categories, the mail server 10 determines the electronic mail to be a problematic electronic mail and inhibits the electronic mail from being sent, and issues a warning or the like to an employee who created the electronic mail. On the other hand, as for an electronic mail that does not fall under any of the categories, the mail server 10 determines the electronic mail to be a non-problematic electronic mail, and sends the electronic mail to a destination.

Moreover, the mail server 10 analyzes the electronic-mail sending state with respect to each mail address, and generates a result of analysis. For example, with respect to each mail address, the mail server 10 counts the number of sent electronic mails falling under each of the following categories: information leakage, slander, abuse of power, and sexual harassment. Then, the mail server 10 displays the total count in each category on a display unit such as a display, or outputs the total number for each category as a report.

Incidentally, in the present embodiment, information leakage, slander, abuse of power, and sexual harassment are given as an example of categories of classification; however, the categories are not limited to these, and can arbitrarily subject to addition or modification. Furthermore, in the present embodiment, outgoing mails are objects to be analyzed; however, the objects to be analyzed are not limited to these, and can be incoming mails or both outgoing mails and incoming mails.

Functional Configuration

Figure 2:
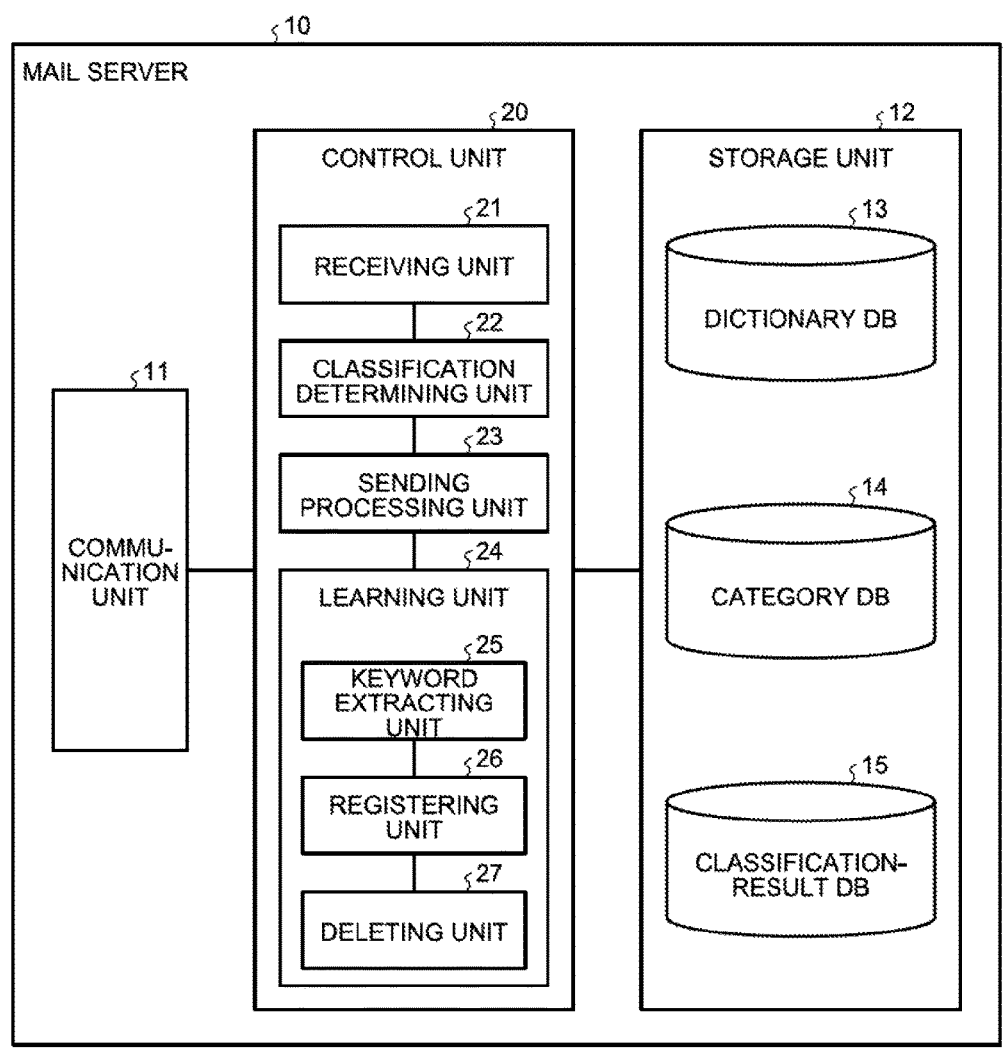
FIG. 2 is a functional block diagram illustrating a functional configuration example of a mail server according to the first embodiment.

FIG. 2 is a functional block diagram illustrating a functional configuration example of the mail server 10 according to the first embodiment. As illustrated in FIG. 2, the mail server 10 includes a communication unit 11, a storage unit 12, and a control unit 20.

The communication unit 11 is a processing unit that controls communication with another device. For example, the communication unit 11 receives an outgoing electronic mail from electronic equipment used by an employee 1. Furthermore, the communication unit 11 sends an outgoing electronic mail to a destination. Furthermore, the communication unit 11 receives an instruction for an analysis result from an administrator terminal used by the administrator 5, and sends the analysis result to the administrator terminal.

The storage unit 12 is a storage device that stores therein a program executed by the control unit 20 and data used for each process, and is, for example, a memory, a hard disk, or the like. This storage unit 12 stores therein a dictionary database (DB) 13, a category DB 14, and a classification-result DB 15.

The dictionary DB 13 is a database for storing therein information on words to be extracted from the content of an electronic mail when the electronic mail is classified. For example, the dictionary DB 13 stores therein words with respect to each part of speech, a classification dictionary used for morphological analysis and the like, commonly used coined words, etc.

The category DB 14 is a database for storing therein information on categories into which electronic mails are classified. FIG. 3 is a diagram illustrating an example of information stored in the category DB 14. As illustrated in FIG. 3, the category DB 14 stores therein "category", "applicable KW", "excludable KW", and "NG-KW" in an associated manner.

"Category" stored in the category DB 14 indicates information that identifies a category of classification. "Applicable KW" indicates a keyword (hereinafter, sometimes referred to as "KW") such as a word determined to fall under the category, and is a keyword of which the frequency of use in the category is determined to be relatively high. "Excludable KW" indicates a keyword that is frequently used in electronic mails falling under the category yet is also frequently used in normal mails not falling under any of the categories. "NG-KW" indicates a keyword determining which category an electronic mail including the keyword falls under; an electronic mail including an NG-KW is determined to fall under a corresponding category, regardless of whether the electronic mail further includes a keyword falling under any of the other categories. Incidentally, "applicable KW" and "excludable KW" are subject to a learning process to be described later, and "NG-KW" is set by the administrator 5 or the like.

The example of FIG. 3 indicates that an electronic mail including any of keywords such as "business connection" and "confidentiality" is likely to be the one falling under "information leakage", and an electronic mail including a keyword such as "trade secret" falls under "information leakage". Furthermore, it indicates that an electronic mail including a keyword such as "estimate" is likely to be the one falling under "information leakage", yet is determined to be a normal mail.

Moreover, it is also possible to manage each keyword in association with information identifying whether the keyword is a keyword manually set by the administrator 5 or the like or a keyword learned through the learning process to be described later. For example, the category DB 14 can store therein each KW in association with "Default". In a case of a keyword manually set by the administrator 5, "Yes" is set in the "Default".

The classification-result DB 15 is a database for storing therein a result of classification of an outgoing electronic mail to be classified. For example, the classification-result DB 15 stores therein an electronic mail and a result of its classification so as to be associated with each other. Furthermore, the classification-result DB 15 can store therein a result of classification with respect to each outgoing mail address or each incoming mail address, or can store therein a result of classification with respect to each combination of an outgoing mail address or an incoming mail address.

The control unit 20 is a processing unit that controls processing by the entire mail server 10, and is, for example, a processor or the like. This control unit 20 includes a receiving unit 21, a classification determining unit 22, a sending processing unit 23, and a learning unit 24. Incidentally, the receiving unit 21, the classification determining unit 22, the sending processing unit 23, and the learning unit 24 are an example of an electronic circuit, such as a processor, or an example of a process executed by a processor or the like.

The receiving unit 21 is a processing unit that receives an electronic mail. Specifically, the receiving unit 21 receives an outgoing electronic mail sent from electronic equipment used by an employee 1 to a destination, and outputs the received electronic mail to the classification determining unit 22.

The classification determining unit 22 is a processing unit that classifies an electronic mail received by the receiving unit 21 according to information stored in the category DB 14. Specifically, the classification determining unit 22 determines which of information leakage, slander, abuse of power, sexual harassment, and normal mail an electronic mail falls under, and stores a result of the determination in the classification-result DB 15.

Furthermore, the classification determining unit 22 can adopt various classification techniques used for keyword classification, category classification, etc. Here, an example of a classification technique is explained. For example, the classification determining unit 22 extracts a text written in the subject of a received electronic mail and a text written in the body of the electronic mail, and extracts a word by performing a morphological analysis or the like with reference to the dictionary DB 13. Then, the classification determining unit 22 classifies the electronic mail according to whether the extracted word corresponds to any KW in the category DB. Incidentally, if the electronic mail is not classified as any of the categories, the classification determining unit 22 classifies the electronic mail as a normal mail and stores a copy of the normal mail and a result of the classification in the classification-result DB 15.

For example, if "trade secret" is included in extracted words, the classification determining unit 22 classifies the electronic mail as "information leakage", regardless of states of the other words. Likewise, if "goldbricker" is included in extracted words, the classification determining unit 22 classifies the electronic mail as "abuse of power", regardless of states of the other words.

Furthermore, if extracted words include "three" words falling under applicable KW of information leakage, "ten" words falling under applicable KW of slander, "two" words falling under applicable KW of abuse of power, and "four" words falling under applicable KW of sexual harassment, the classification determining unit 22 selects "slander" corresponding to the largest number of words and classifies the electronic mail as "slander".

Moreover, if extracted words include "three" words falling under applicable KW of information leakage, "ten" words falling under applicable KW of slander, "two" words falling under applicable KW of abuse of power, and "seven" words falling under applicable KW of sexual harassment, the classification determining unit 22 selects "slander" and "sexual harassment" corresponding to the number of words equal to or more than a threshold (for example, five) and classifies the electronic mail as both "slander" and "sexual harassment".

Furthermore, if multiple categories corresponding to the number of words equal to or more than the threshold have been extracted, the classification determining unit 22 can use the number of extracted excludable KW. For example, if extracted words include "three" words falling under applicable KW of information leakage, "ten" words falling under applicable KW of slander, "two" words falling under applicable KW of abuse of power, and "seven" words falling under applicable KW of sexual harassment, the classification determining unit 22 selects "slander" and "sexual harassment" corresponding to the number of words equal to or more than the threshold (for example, five).

Then, the classification determining unit 22 identifies that "three" excludable KW of "slander" and "zero" excludable KW of "sexual harassment" have been extracted. More words corresponding to "slander" are used in the electronic mail, and yet many of them are also used in normal mails; therefore, the classification determining unit 22 classifies the electronic mail as "sexual harassment" corresponding to the smaller number of excludable KW.

Moreover, the classification determining unit 22 can make a classification using respective extraction ratios of applicable KW and excludable KW. For example, the classification determining unit 22 can identify a category corresponding to a ratio of applicable KW to all extracted words of equal to or more than a predetermined value (a threshold A) and a ratio of excludable KW of equal to or less than a predetermined value (a threshold B) and classify the electronic mail as the identified category.

The sending processing unit 23 is a processing unit that sends a received electronic mail to a destination. For example, the sending processing unit 23 sends an electronic mail determined to be a normal mail to a destination. As for a risky electronic mail classified as any of the categories listed in the category DB 14, the sending processing unit 23, for example, sends a warning to a sender, or sends the electronic mail with a message such as "Please consult with the administrator" to a destination.

The learning unit 24 is a processing unit that includes a keyword extracting unit 25, a registering unit 26, and a deleting unit 27 and learns various KW stored in the category DB 14 using these units. Incidentally, the learning process can be performed on a regular basis, or can be performed at arbitrary timing. Furthermore, the learning unit 24 performs the learning process on an electronic mail stored in the classification-result DB 15, i.e., an electronic mail classified as any of the categories.

The keyword extracting unit 25 is a processing unit that extracts a keyword from an electronic mail that has been subjected to classification. Specifically, the keyword extracting unit 25 reads out an electronic mail and its category that the classification-result DB 15 has classified, and extracts a keyword from the subject and body of the read electronic mail by using a known technique such as co-occurrence probability or clustering. Then, the keyword extracting unit 25 outputs a result of the extraction to the registering unit 26.

Here, a specific example of keyword extraction is explained. FIG. 4 is a diagram for explaining an example of extraction of a classification keyword using co-occurrence probability. As illustrated in FIG. 4, here we give an example of twenty electronic mails, Mails 1 to 20, classified as "slander". As illustrated in FIG. 4, the keyword extracting unit 25 extracts a keyword from the twenty mails with reference to the dictionary DB 13, etc. Here, out of the twenty mails, the keyword extracting unit 25 excludes keywords that have already registered in "applicable KW" of "slander", such as "idiot" and "fool", and sets "banana", "orange", and "apple" as candidates for registration.

In the example of FIG. 4, the number of electronic mails including "banana" in the twenty electronic mails is "ten"; therefore, the rate of occurrence is calculated as follows: "10/20×100=50%". The number of electronic mails including "orange" in the twenty electronic mails is "nine"; therefore, the rate of occurrence is calculated as follows: "9/20×100=45%". The number of electronic mails including "apple" in the twenty electronic mails is "seven"; therefore, the rate of occurrence is calculated as follows: "7/20×100=35%".

As a result, the keyword extracting unit 25 extracts "banana" having the rate of occurrence that is equal to or more than a threshold (50%) as a keyword to be registered.

Next, an example of extraction of a classification keyword using clustering is explained. FIG. 5 is a diagram for explaining an example of extraction of a classification keyword using clustering. As illustrated in FIG. 5, the category "slander" is assumed to include the following keywords: "fool", "idiot", "trash", "stupid", and "die". Under such circumstances, the keyword extracting unit 25 extracts keywords of "fool", "idiot", "trash", "banana", "stupid", "die", and "apple" from all mails classified as "slander" with reference to the dictionary DB 13, etc.

Then, using learning algorithm for clustering based on synonym or dependency, the keyword extracting unit 25 performs clustering on the extracted keywords: "fool", "idiot", "trash", "banana", "stupid", "die", and "apple". Then, the keyword extracting unit 25 classifies "fool", "idiot", "trash", and "banana" as Cluster A, and classifies "stupid", "die", and "apple" as Cluster B.

As a result, the keyword extracting unit 25 selects a subset with the fewest keywords not appearing in mails, i.e., Cluster A with more classified keywords. Then, out of "fool", "idiot", "trash", and "banana" in Cluster A, the keyword extracting unit 25 extracts "banana" which is unregistered as a keyword to be registered.

Incidentally, the keyword extracting unit 25 can perform either the extraction process using co-occurrence probability or the extraction process using clustering, or can perform both. For example, the keyword extracting unit 25 can determine a keyword extracted by using either co-occurrence probability or clustering to be an object to be registered, or can determine a keyword extracted by using both co-occurrence probability and clustering to be an object to be registered.

The registering unit 26 is a processing unit that registers a new keyword in the category DB 14. Specifically, the registering unit 26 acquires a "category" which is where to register and a "keyword" be registered from the keyword extracting unit 25, and registers the keyword in applicable KW of the category. For example, if the registering unit 26 has acquired "slander" and "banana" from the keyword extracting unit 25, the registering unit 26 registers "banana" in applicable KW of the category "slander" in the category DB 14. At this time, if "banana" corresponds to an existing excludable KW of the category "slander", the registering unit 26 inhibits registration of "banana".

Figure 6:
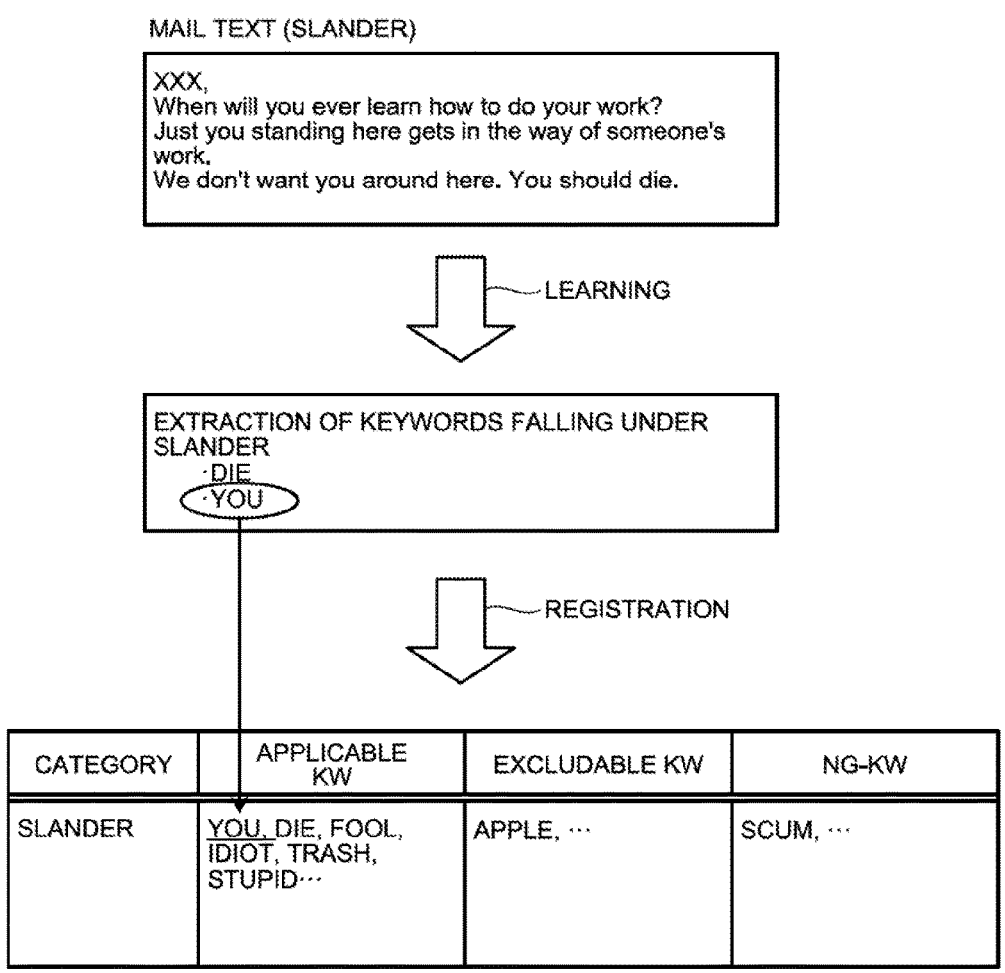
FIG. 6 is a diagram for explaining an example of automatic addition of a keyword.

FIG. 6 is a diagram for explaining an example of automatic addition of a keyword. As illustrated in FIG. 6, the keyword extracting unit 25 extracts, as keywords, "die" and "you (in an angry tone)" from a mail falling under slander. As "die" has been already registered, so the registering unit 26 registers "you" which is unregistered in applicable KW of the category "slander".

Furthermore, the registering unit 26 can extract an excludable KW and newly registers the extracted excludable KW. For example, the registering unit 26 reads out electronic mails classified as normal mail from the classification-result DB 15, and extracts a keyword from each of the electronic mails. Then, the registering unit 26 identifies a keyword included in a threshold (for example, 70%) of normal mail, and stores the keyword in excludable KW of each category in the category DB 14.

Moreover, as for a keyword to be registered extracted by the keyword extracting unit 25, the registering unit 26 can determine whether the keyword falls under excludable KW, and, if it falls under excludable KW, register the keyword in excludable KW. To explain with the above-described example, the registering unit 26 determines how many of normal mails include the keyword "banana" to be registered acquired from the keyword extracting unit 25. If the rate of the keyword "banana" to be registered in normal mails is less than a threshold (for example, 50%), the registering unit 26 registers "banana" in applicable KW of the category "slander" in the category DB 14; on the other hand, if the rate is equal to or more than the threshold, the registering unit 26 registers "banana" in excludable KW of the category "slander" in the category DB 14.

The deleting unit 27 is a processing unit that deletes, out of applicable KW stored in the category DB 14, a less frequently used keyword. Specifically, each time the above-described learning process is performed, the deleting unit 27 counts the number of appearances of each KW registered in applicable KW of each category. Then, the deleting unit 27 deletes a KW of which the number of appearances is below a threshold for a predetermined number of times in a row or a KW meeting a prespecified condition for deletion such that the number of appearances is below the threshold from applicable KW.

Furthermore, if an applicable KW to be deleted is a default KW set by an administrator, the deleting unit 27 inhibits deletion of the KW; if an applicable KW to be deleted is a KW learned through the learning process in the past, the deleting unit 27 deletes the KW. Incidentally, as for excludable KW, the deleting unit 27 can delete a less frequently used keyword in normal mail by using the same technique.

FIG. 7 is a diagram for explaining an example of automatic deletion of a keyword. As illustrated in FIG. 7, it is assumed that the number of extractions of the applicable KW "you" in the category of slander is "20", the number of extractions of the applicable KW "die" is "35", the number of extractions of the applicable KW "fool" is "9", the number of extractions of the applicable KW "idiot" is "2", and the number of extractions of the applicable KW "trash" is "16". In this case, the deleting unit 27 determines "fool" and "idiot" of which number of extractions is less than a threshold (10) to be objects to be deleted, but excludes "fool" from the objects to be deleted because "Default=Yes"

has been set. As a result, the deleting unit 27 deletes "idiot" from applicable KW of slander.

Flow of Process

Subsequently, the flows of various processes performed by the mail server 10 are explained. Here, a classification process, an addition process, and a deletion process are explained.

Flow of Classification Process

Figure 8:
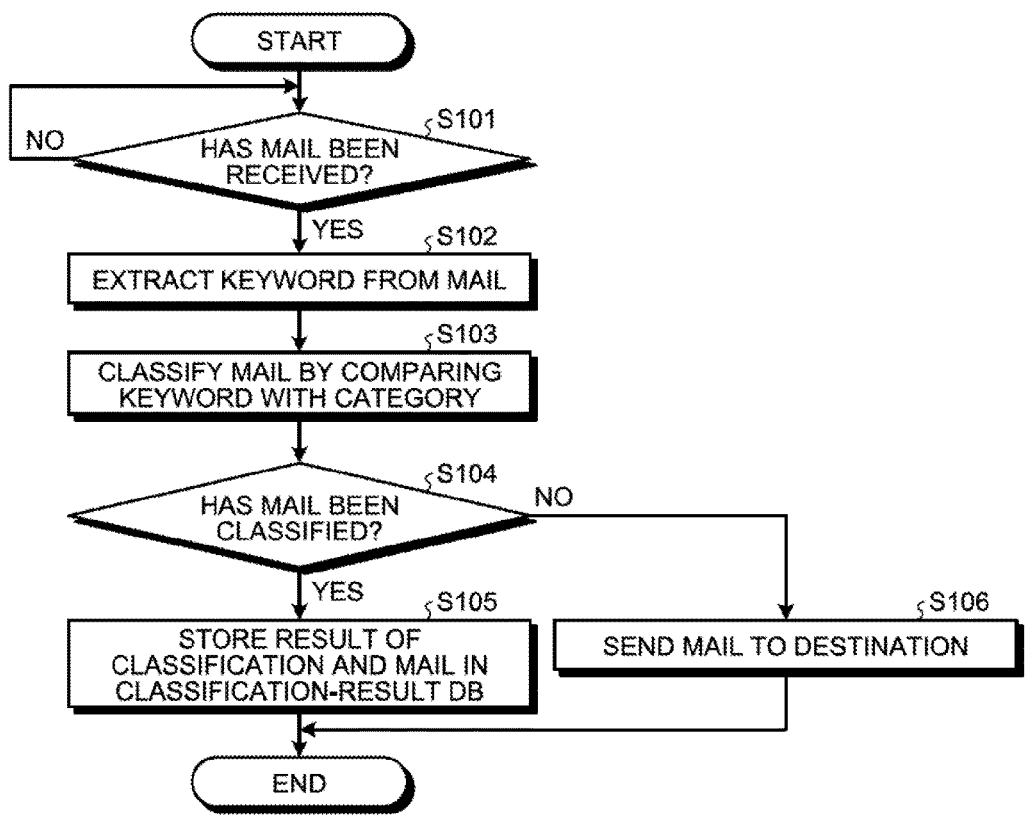
FIG. 8 is a flowchart illustrating the flow of a mail classifying process.

FIG. 8 is a flowchart illustrating the flow of a mail classifying process. As illustrated in FIG. 8, when a mail has been received by the receiving unit 21 (YES at S101), the classification determining unit 22 extracts a keyword from the mail with reference to the dictionary DB 13 (S102).

Then, the classification determining unit 22 classifies the mail by comparing the extracted keyword with information on category stored in the category DB 14 (S103). Then, when having successfully classified the mail (YES at S104), the classification determining unit 22 stores the mail and a result of the classification in the classification-result DB 15 (S105).

On the other hand, when having failed to classify the mail (NO at S104), the classification determining unit 22 determines that the mail is a normal mail, and the sending processing unit 23 sends the mail to a destination (S106). Incidentally, also in the case of a normal mail, the classification determining unit 22 stores a copy of the mail and a result of the classification in the classification-result DB 15.

Flow of Addition Process

Figure 9:
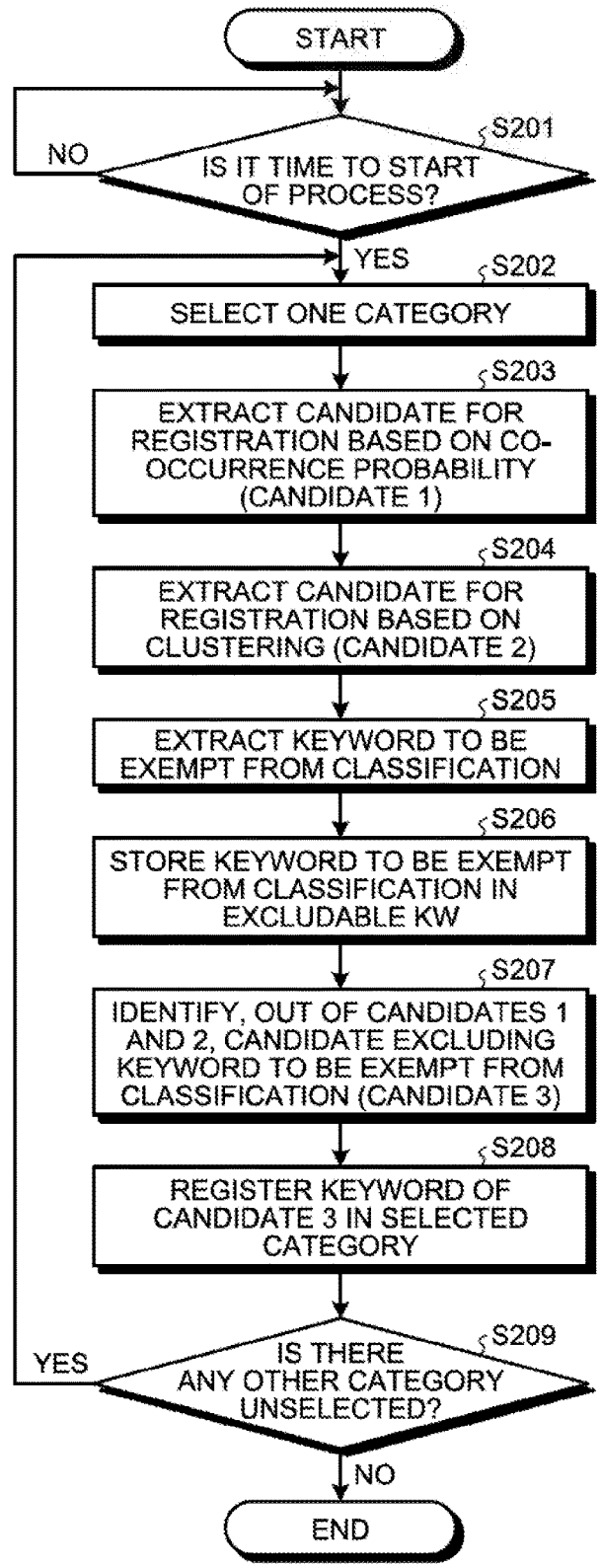
FIG. 9 is a flowchart illustrating the flow of a keyword adding process.

FIG. 9 is a flowchart illustrating the flow of a keyword adding process. As illustrated in FIG. 9, at the timing of start of the process (YES at S201), the keyword extracting unit 25 selects one category (S202), and acquires mails classified as the selected category and extracts a candidate for registration based on co-occurrence probability (Candidate 1) (S203).

Then, the keyword extracting unit 25 extracts a candidate for registration based on clustering (Candidate 2) from the mails classified as the selected category (S204). After that, the registering unit 26 extracts a keyword to be exempt from classification, i.e., a keyword to be exempt from registration by using normal mails, etc. (S205).

Then, the registering unit 26 stores the keyword to be exempt from classification in excludable KW (S206). Furthermore, the registering unit 26 identifies, out of Candidates 1 and 2, a candidate for registration excluding the excludable KW (Candidate 3) (S207).

Then, the registering unit 26 registers the keyword of Candidate 3 in applicable KW of the selected category (S208). After that, if there is any other category unselected (YES at S209), the processes at S209 onward are performed. On the other hand, if there is no category unselected (NO at S209), the addition process is terminated.

Flow of Deletion Process

Figure 10:
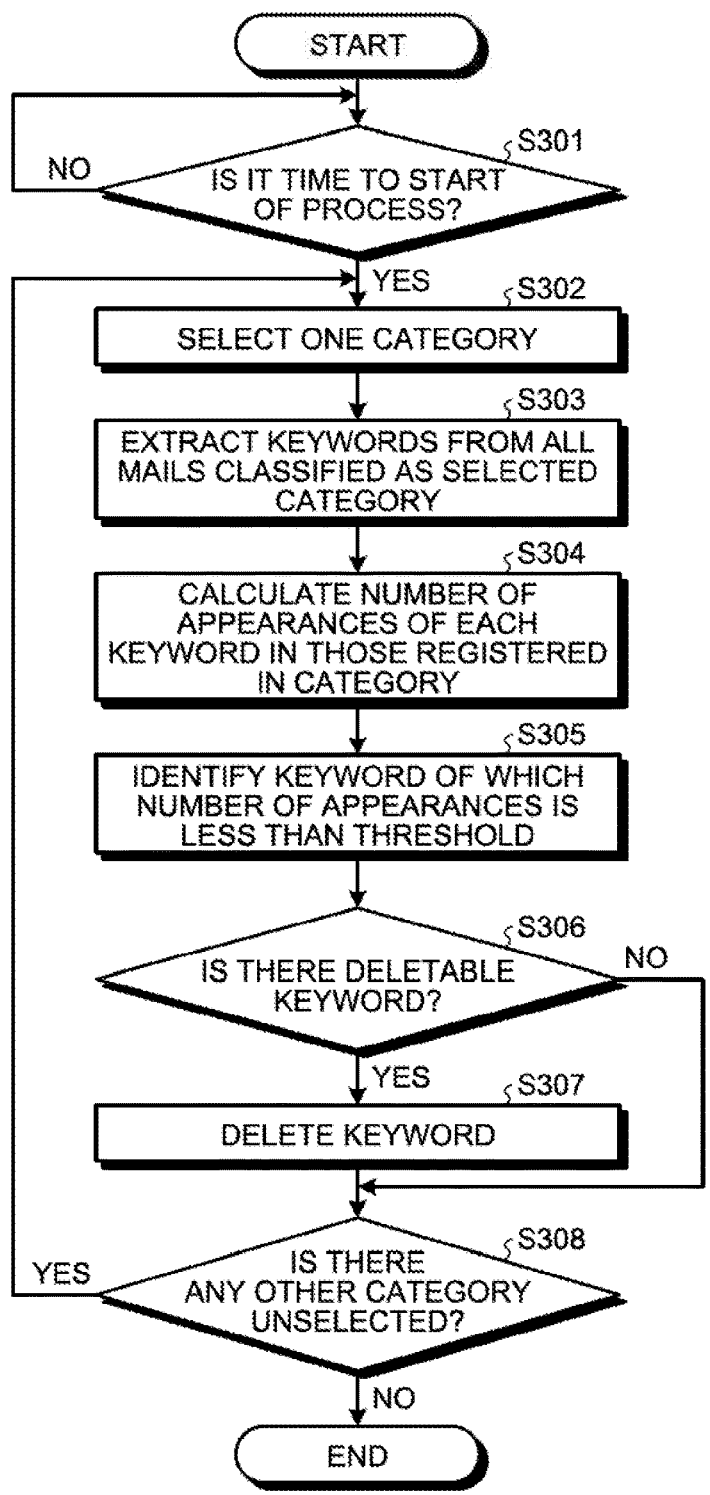
FIG. 10 is a flowchart illustrating the flow of a keyword deleting process.

FIG. 10 is a flowchart illustrating the flow of a keyword deleting process. As illustrated in FIG. 10, at the timing of start of the process (YES at S301), the deleting unit 27 selects one category (S302), and extracts keywords from, out of mails stored in the classification-result DB 15, mails classified as the selected category (S303).

Then, using the keywords extracted from the mails classified as the selected category, the deleting unit 27 calculates the number of appearances of each keyword in those registered in the "category" of the category DB 14 (S304). Then, the deleting unit 27 identifies a keyword of which the number of appearances is less than a threshold (S305).

After that, if there is a deletable keyword in the identified keywords of which the number of appearances is less than the threshold (YES at S306), the deleting unit 27 deletes the keyword from Applicable KW of the category DB 14 (S307). That is, the deleting unit 27 deletes, out of the identified keywords of which the number of appearances is less than the threshold, a keyword which is not a default keyword.

On the other hand, if there is no deletable keyword (NO at S306), the process at S308 is performed. Then, if there is any other category unselected (YES at S308), the processes at S302 onward are performed. On the other hand, if there is no category unselected (NO at S308), the deletion process is terminated.

Advantageous Effects

The mail server 10 according to the first embodiment can learn KW used in each category periodically, and therefore can keep up with changes of the times or daily changes due to changes in fashion, etc. Consequently, the number of extractions could decrease by continuing to use the same conditions for extraction; however, the improvement in the number of extractions can be expected by periodically updating the conditions for extraction. As a result, it is possible to maintain the accuracy of extracting electronic mails having a harmful impact and violating the compliance.

Furthermore, the mail server 10 can always change the value (weight) of a keyword in consideration of the passage of time and the transition of time, and can maintain the newness and optimality of the conditions for extraction and perform the update and deletion of keywords.

Moreover, the mail server 10 can obtain an original evaluation or peculiar evaluation where usual keywords are not subject to evaluation, and can obtain a result meeting user's needs. Furthermore, the mail server 10 learns keywords suited to a user, thereby can learn keywords tailored to the user and improve the extraction accuracy.

[b] Second Embodiment

Overall Configuration

The above-described mail server 10 can analyze the mail sending state of each employee 1 in addition to the processes described in the first embodiment. In a second embodiment, there is described an example in which the mail server 10 analyzes how risky mails each employee 1 is sending with respect to each mail address. Incidentally, the overall configuration of the server 10 is the same as in the first embodiment, so description of the overall configuration is omitted.

Functional Configuration

Figure 11:
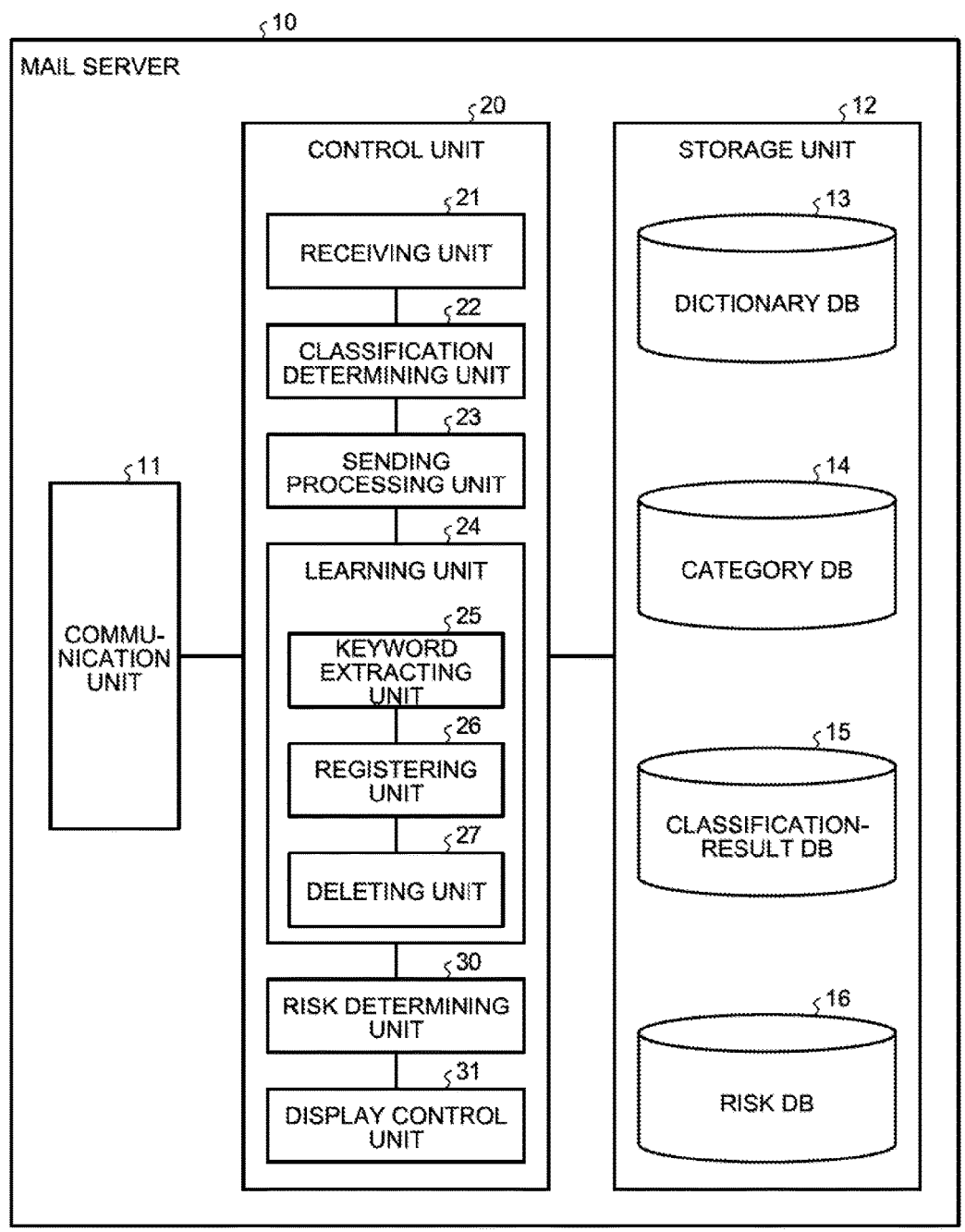
FIG. 11 is a functional block diagram illustrating a functional configuration of a mail server according to a second embodiment.

FIG. 11 is a functional block diagram illustrating a functional configuration of the mail server 10 according to the second embodiment. As illustrated in FIG. 11, the mail server 10 includes the communication unit 11, the storage unit 12, and the control unit 20. The difference from the first embodiment is that the mail server 10 according to the second embodiment further includes a risk DB 16, a risk determining unit 30, and a display control unit 31. Therefore, in the second embodiment, the risk DB 16, the risk determining unit 30, and the display control unit 31 are explained. Incidentally, the storage unit 12 stores therein outgoing electronic mails, i.e., all mails received by the receiving unit 21.

The risk DB 16 is a database for storing therein the determined degree of risk with respect to each mail address. Specifically, the risk DB 16 stores therein the degree of risk determined in a process to be described later with respect to each outgoing mail address, each destination mail address, and each combination of an outgoing mail address or a destination mail address. That is, the risk DB 16 stores therein information that can identify a user who sends a mail corresponding to any of information leakage, slander, abuse of power, sexual harassment, etc.

The risk determining unit 30 is a processing unit that determines a user having a high risk of sending a malicious mail with respect to each mail address. Specifically, the risk determining unit 30 determines the degree of risk according to predetermined criteria for determination with respect to each outgoing mail address, each destination mail address, and each combination of an outgoing mail address or a destination mail address, and stores a result of the destination in the risk DB 16.

For example, the risk determining unit 30 converts the number of mails classified as each category to point. For example, when two mails have been classified as information leakage, the risk determining unit 30 calculates these mails as mails as 2 points; also when two mails have been classified as information leakage and sexual harassment, the risk determining unit 30 calculates these mails as 2 points. Furthermore, if the risk determining unit 30 has performed a risk determination on Wednesday, the risk determining unit 30 performs the first week (1st week) determination based on points in three days including the day, i.e., points on "Monday, Tuesday, and Wednesday" of the week.

Incidentally, the risk determining unit 30 determines risk not by the number of points but by the rate of points. For example, when 2 points are accumulated in the three days on Monday, Tuesday, and Wednesday, the rate of points is "2/3=0.6666≈0.67".

Here, an example of criteria for risk determination is explained. FIG. 12 is a diagram for explaining a standard example of risk determination. As illustrated in FIG. 12, criteria for determination are set in each risk level. Incidentally, here, Risk 5 is the highest level of risk. Furthermore, multiple conditions for determination are set in each risk level; these conditions can be OR conditions or AND conditions, and can be arbitrarily set. Here, the conditions for determination are described as OR conditions as an example.

As illustrated in FIG. 12, the risk determining unit 30 determines a mail address corresponding to "(the rate of points in the week of determination)≥1.5" or "(the rate of points in a week of four weeks ago)≥1.4, and (the rate of points in a week of three weeks ago)≥1.4, and (the rate of points in a week of two weeks ago)≥1.4, and (the rate of points in a week of one week ago)≥1.4" to fall under Risk 5.

Furthermore, the risk determining unit 30 determines a mail address corresponding to "(the rate of points in a week of four weeks ago)+(the rate of points in a week of three weeks ago)+(the rate of points in a week of two weeks ago)+(the rate of points in a week of one week ago)≥4.2" to fall under Risk 4. Also, the risk determining unit 30 determines a mail address corresponding to "(the rate of points in a week of four weeks ago)+(the rate of points in a week of three weeks ago)+(the rate of points in a week of two weeks ago)+(the rate of points in a week of one week ago)≥3.6" and "having been classified as two or more categories in the last four weeks" to fall under Risk 4. Also, the risk determining unit 30 determines a mail address corresponding to "(the rate of points in the week of determination)≥1.0" to fall under Risk 4. Also, the risk determining unit 30 determines a mail address corresponding to "(the rate of points in a week of four weeks ago)≥0.8, and (the rate of points in a week of three weeks ago)≥0.8, and (the rate of points in a week of two weeks ago)≥0.8, and (the rate of points in a week of one week ago)≥0.8" to fall under Risk 4.

Moreover, the risk determining unit 30 determines a mail address corresponding to "(the rate of points in a week of four weeks ago)+(the rate of points in a week of three weeks ago)+(the rate of points in a week of two weeks ago)+(the rate of points in a week of one week ago)≥2.4" to fall under Risk 3. Also, the risk determining unit 30 determines a mail address corresponding to "(the rate of points in a week of four weeks ago)+(the rate of points in a week of three weeks ago)+(the rate of points in a week of two weeks ago)+(the rate of points in a week of one week ago)≥1.8" and "having been classified as two or more categories in the last four weeks" to fall under Risk 3. Also, the risk determining unit 30 determines a mail address corresponding to "(the rate of points in the week of determination)≥0.5" to fall under Risk 3.

Furthermore, the risk determining unit 30 determines a mail address corresponding to "(the rate of points in a week of four weeks ago)+(the rate of points in a week of three weeks ago)+(the rate of points in a week of two weeks ago)+(the rate of points in a week of one week ago)≥1.2" to fall under Risk 2. Also, the risk determining unit 30 determines a mail address corresponding to "(the rate of points in the week of determination)≥0.3" to fall under Risk 2.

Moreover, the risk determining unit 30 determines a mail address corresponding to "(the rate of points in a week of four weeks ago)+(the rate of points in a week of three weeks ago)+(the rate of points in a week of two weeks ago)+(the rate of points in a week of one week ago)≥0.1" to fall under Risk 1. Also, the risk determining unit 30 determines a mail address corresponding to "(the rate of points in the week of determination)>0.0" to fall under Risk 1.

Furthermore, as for a mail address not corresponding to any of the above criteria for determination, the risk determining unit 30 determines the mail address to fall under Risk 0, i.e., normal mail.

The display control unit 31 is a processing unit that displays various information, and performs display control according to user's operation, such as an operation made by the administrator 5. Specifically, the display control unit 31 displays mail addresses with respect to each risk level, transition of mail sending state with respect to each mail address, transition of mail classification before and after category learning, etc. on a display, and sends these data to the administrator terminal.

Furthermore, at the time of learning described in the first embodiment, the display control unit 31 can acquire a result of learning and respective results of various processes performed before the learning from the learning unit 24 and display the acquired information. For example, the display control unit 31 can count the number of extractions of each applicable KW in each category and display aggregate results. Incidentally, the aggregate results can be calculated by the learning unit 24, or can be calculated from respective results of various processes in the learning process by the display control unit 31.

Flow of Risk Determining Process

Figure 13:
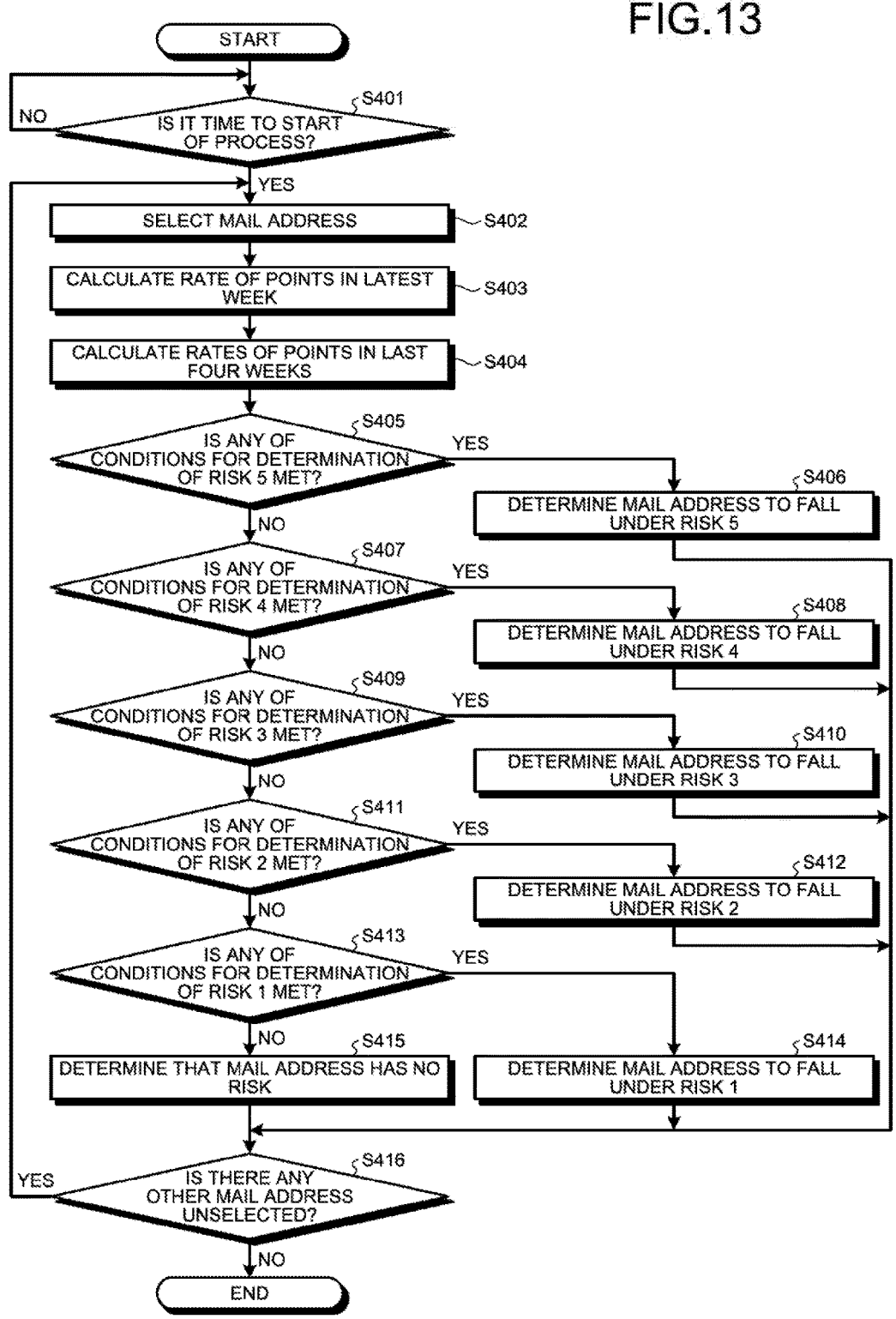
FIG. 13 is a flowchart illustrating the flow of a risk determining process.

FIG. 13 is a flowchart illustrating the flow of a risk determining process. As illustrated in FIG. 13, at the timing of start of the process (YES at S401), the risk determining unit 30 selects one of mail addresses stored in the classification-result DB 15 (S402).

Then, the risk determining unit 30 calculates the rate of points of the selected mail address in the latest week with reference to the classification-result DB 15 (S403), and calculates the total value of the rates of points in the last four weeks (S404). AT this time, the risk determining unit 30 also calculates the number of corresponding categories in the week of determination and the number of corresponding categories in the last four weeks.

Then, if the rate of points or the number of categories meets any of the conditions for determination of Risk 5 (YES at S405), the risk determining unit 30 determines the selected mail address to fall under Risk 5 (S406), and performs the processes at S416 onward.

On the other hand, if the rate of points or the number of categories does not meet any of the conditions for determination of Risk 5 (NO at S405) and meets any of the conditions for determination of Risk 4 (YES at S407), the risk determining unit 30 determines the selected mail address to fall under Risk 4 (S408), and performs the processes at S416 onward.

On the other hand, if the rate of points or the number of categories does not meet any of the conditions for determination of Risk 4 (NO at S407) and meets any of the conditions for determination of Risk 3 (YES at S409), the risk determining unit 30 determines the selected mail address to fall under Risk 3 (S410), and performs the processes at S416 onward.

Furthermore, if the rate of points or the number of categories does not meet any of the conditions for determination of Risk 3 (NO at S409) and meets any of the conditions for determination of Risk 2 (YES at S411), the risk determining unit 30 determines the selected mail address to fall under Risk 2 (S412), and performs the processes at S416 onward.

Moreover, if the rate of points or the number of categories does not meet any of the conditions for determination of Risk 2 (NO at S411) and meets any of the conditions for determination of Risk 1 (YES at S413), the risk determining unit 30 determines the selected mail address to fall under Risk 1 (S414), and performs the processes at S416 onward.

Furthermore, if the rate of points or the number of categories does not meet any of the conditions for determination of Risk 1 (NO at S413), the risk determining unit 30 determines that the selected mail address has no risk (S415). After that, if there is any other mail address unselected (YES at S416), the risk determining unit 30 performs the processes at S402 onward; if there is no mail address unselected (NO at S416), the risk determining unit 30 terminates the process.

Specific Example of Display Control

Subsequently, a display example displayed by the display control unit 31 is explained with FIGS. 14 to 19. Incidentally, the display control unit 31 can acquire a result of risk determination and a result of learning from the risk determining unit 30 and the learning unit 24 each time the processes are performed and store the acquired results in the storage unit 12 or the like.

Result of Mail Determination

Figure 14:
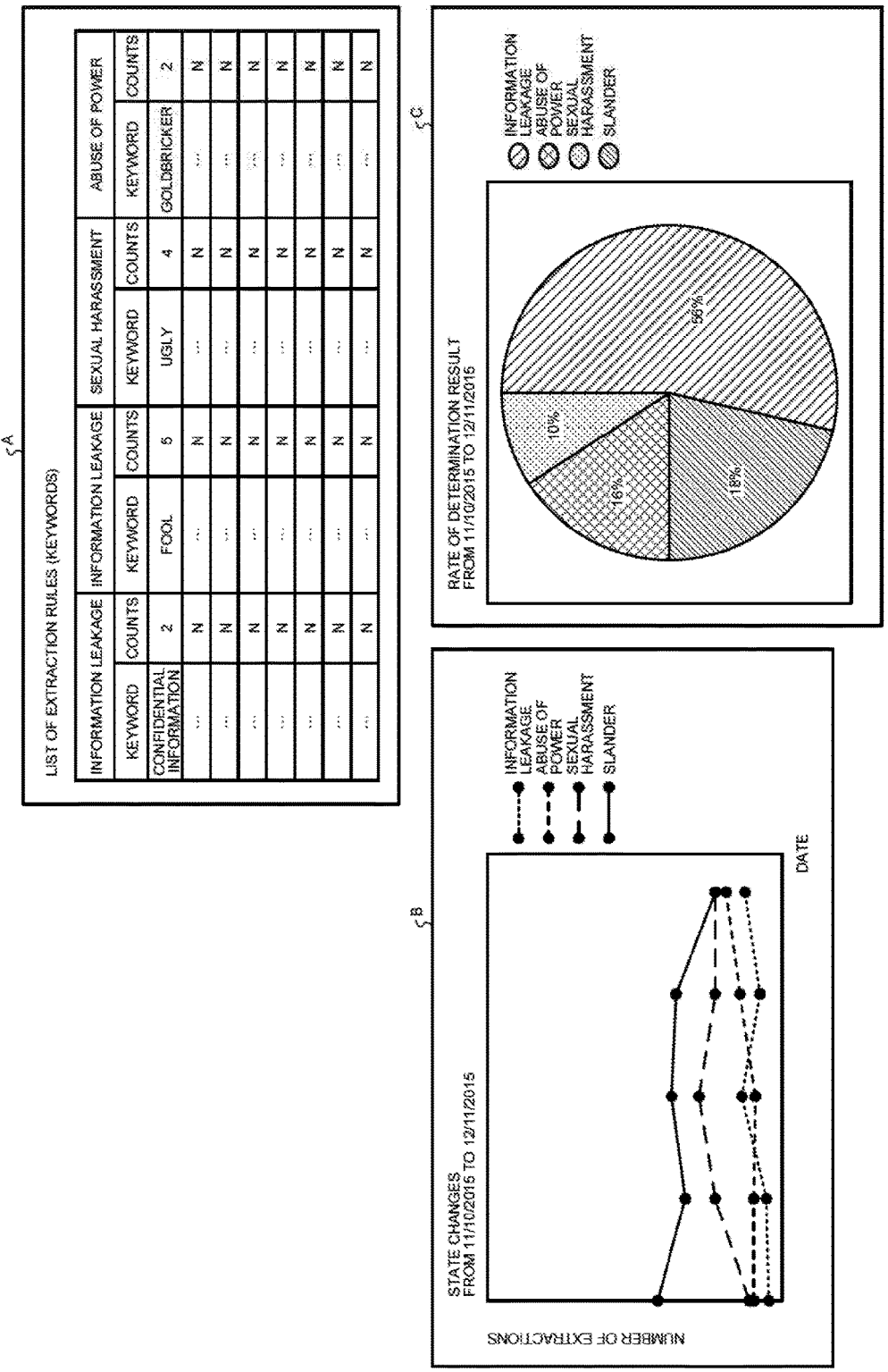
FIG. 14 is a diagram for explaining a display example of a result of mail determination.

FIG. 14 is a diagram for explaining a display example of a result of mail determination. As illustrated in FIG. 14, when having received an instruction to display a result of mail determination, the display control unit 31 can calculate and display a result of risk determination, a result of learning, etc. for a period specified by a user.

For example, as illustrated in FIG. 14, the display control unit 31 displays the number of extractions of extraction keywords (applicable KW, excludable KW, and NG-KW) in each category for a specified period "from 11/10/2015 to 12/11/2015" (see A in FIG. 14). Furthermore, the display control unit 31 counts the number of extractions of each of the extraction keywords for the specified period "from 11/10/2015 to 12/11/2015" thereby can calculates the total number of extractions of extraction keywords in each category, and makes the number of extractions in each category a line graph thereby can display the state transition of the number of extractions (see B in FIG. 14). Moreover, the display control unit 31 can also make the content of the line graph a pie chart (see C in FIG. 14).

State of Risk

Figure 15:
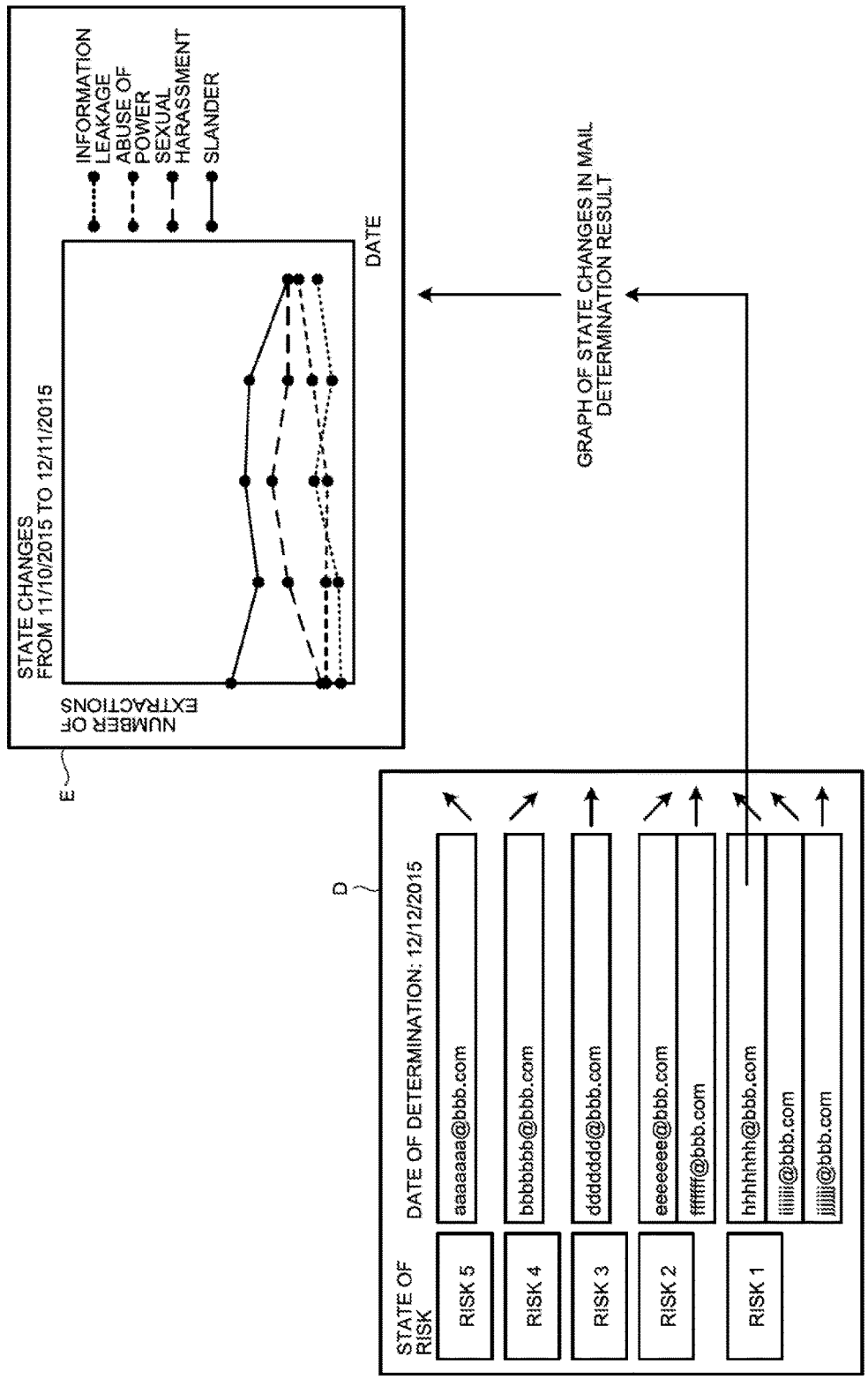
FIG. 15 is a diagram for explaining a display example of the state of risk.

FIG. 15 is a diagram for explaining a display example of the state of risk. As illustrated in FIG. 15, when having received an instruction to display the state of risk, the display control unit 31 can display a result of the latest risk determination. Incidentally, the display control unit 31 can display not only a result of the latest risk determination but also a result of determination in a specified past time or the transition of determination result.

For example, as a result of the latest determination on the date of determination (12/12/2015), the display control unit 31 can display the state of risk, where "risk" is associated with "source mail address" and "transition of determination" (see D in FIG. 15). Incidentally, the transition of determination is information indicating whether the risk is increased as compared with the last time; an up-pointing arrow is displayed if the risk is increased from the last time, a down-pointing arrow is displayed if the risk is decreased from the last time, and a horizontal arrow is displayed if the risk stays unchanged from the last time.

Furthermore, if the display control unit 31 has extracted the selection of one of mail addresses displayed in the state of risk, it is possible to display a line graph of the transition of category classification result (the number of classification categories) in a period (from 11/10/2015 to 12/11/2015) subject to determination on the date of determination (12/12/2015) (see E in FIG. 15). Incidentally, the display control unit 31 can also display not a category classification result but a mail text. Furthermore, here we give an example of a source mail address; however, an incoming mail address or a combination of a source mail address and an incoming mail address can be processed in the same way.

Display of Risk

FIG. 16 is a diagram for explaining a display example of each risk level. As illustrated in FIG. 16, when having received an instruction to display the risk list, the display control unit 31 can display a list of mail addresses corresponding to each risk level according to a result of the latest risk determination. Incidentally, the display control unit 31 can display not only a result of the latest risk determination but also a result of determination in a specified past time.

In the example of FIG. 16, the display control unit 31 displays a screen on which a tab for Risk 5 is in a selected state, and a list of source mail addresses, a list of destination mail addresses, and a list of combinations of a source and a destination that correspond to Risk 5 are displayed on the screen. Upon receipt of selection of a tab, the display control unit 31 switches the display to an address list for a corresponding risk level.

Figure 17:
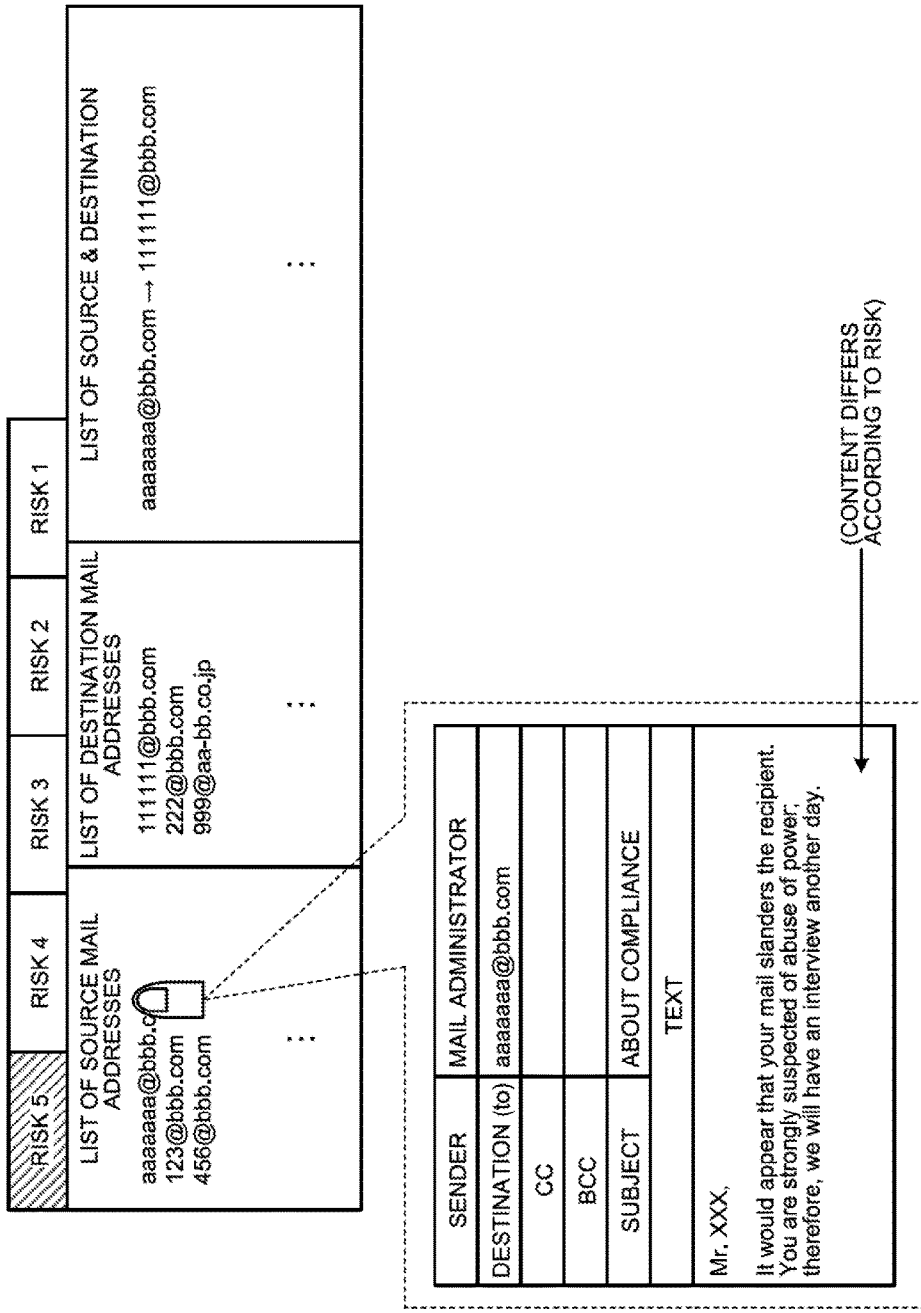
FIG. 17 is a diagram for explaining a creation example of a warning mail.

Then, in this state, if a mail address has been selected, the display control unit 31 can automatically create and send a warning mail. FIG. 17 is a diagram for explaining a creation example of a warning mail. As illustrated in FIG. 17, if a source mail address "aaaaaaa@bbb.com" determined to fall under Risk 5 has been selected, the display control unit 31 automatically create a warning mail to "aaaaaaa@bbb.com".

The text of the created warning mail can be automatically changed according to risk level, mail address, and classification state. For example, the higher the risk level of a mail, the more likely it is to go against the law; therefore, the display control unit 31 issues a firmer warning. For example, to a person of Risk 5, the display control unit 31 creates a warning mail informing him/her about taking a legal step or taking a measure such as having an interview; to a person of Risk 1, the display control unit 31 creates a warning mail prompting him/her to be careful about his/her language.

Furthermore, to a source mail address, the display control unit 31 creates a warning message as described above; to a destination mail address, the display control unit 31 creates a message prompting to consult with somebody with contact information of the administrator 5 or the contact center; to both source and destination mail addresses, the display control unit 31 creates a message informing the both to arrange an opportunity for a discussion with a third person.

Moreover, the display control unit 31 can create various messages to a category corresponding to the largest number of classified categories with respect to the selected mail address. Furthermore, the display control unit 31 can also create a warning mail to a category of which the number of classified categories with respect to the selected mail address exceeds a threshold. Incidentally, even when a mail address displayed in the state of risk illustrated in FIG. 15 (see E in FIG. 15) has been selected, the display control unit 31 can create a warning mail.

State of Appearance

Figure 18:
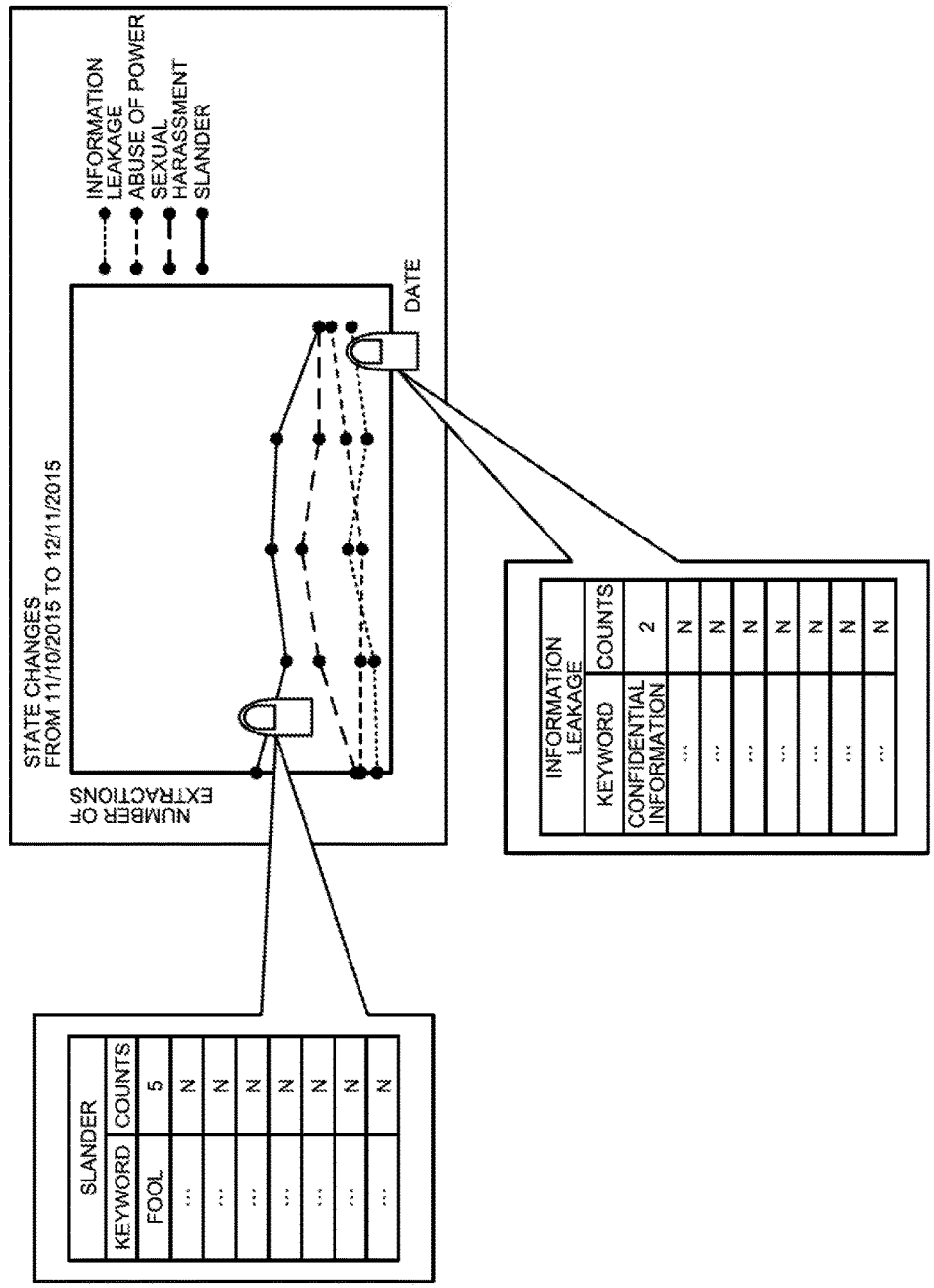
FIG. 18 is a diagram for explaining an example of how to display the keyword appearance state from a graph.

FIG. 18 is a diagram for explaining an example of how to display the keyword appearance state from a graph. As illustrated in FIG. 18, if any of line graphs has been selected from line graphs indicating the state transition of the number of extractions in each category (see B in FIG. 14), the display control unit 31 can display the number of extractions of each of extraction words in each category.

In the example of FIG. 18, when the display control unit 31 has extracted that a graph of slander has been selected, the display control unit 31 displays the number of extractions of each KW in the category "slander". Likewise, when the display control unit 31 has extracted that a graph of information leakage has been selected, the display control unit 31 displays the number of extractions of each KW in the category "information leakage". Incidentally, the number of extractions displayed here is the number of extractions within a specified period displayed on the graph of state changes.

Transition of Extraction Before and After Learning

Figure 19:
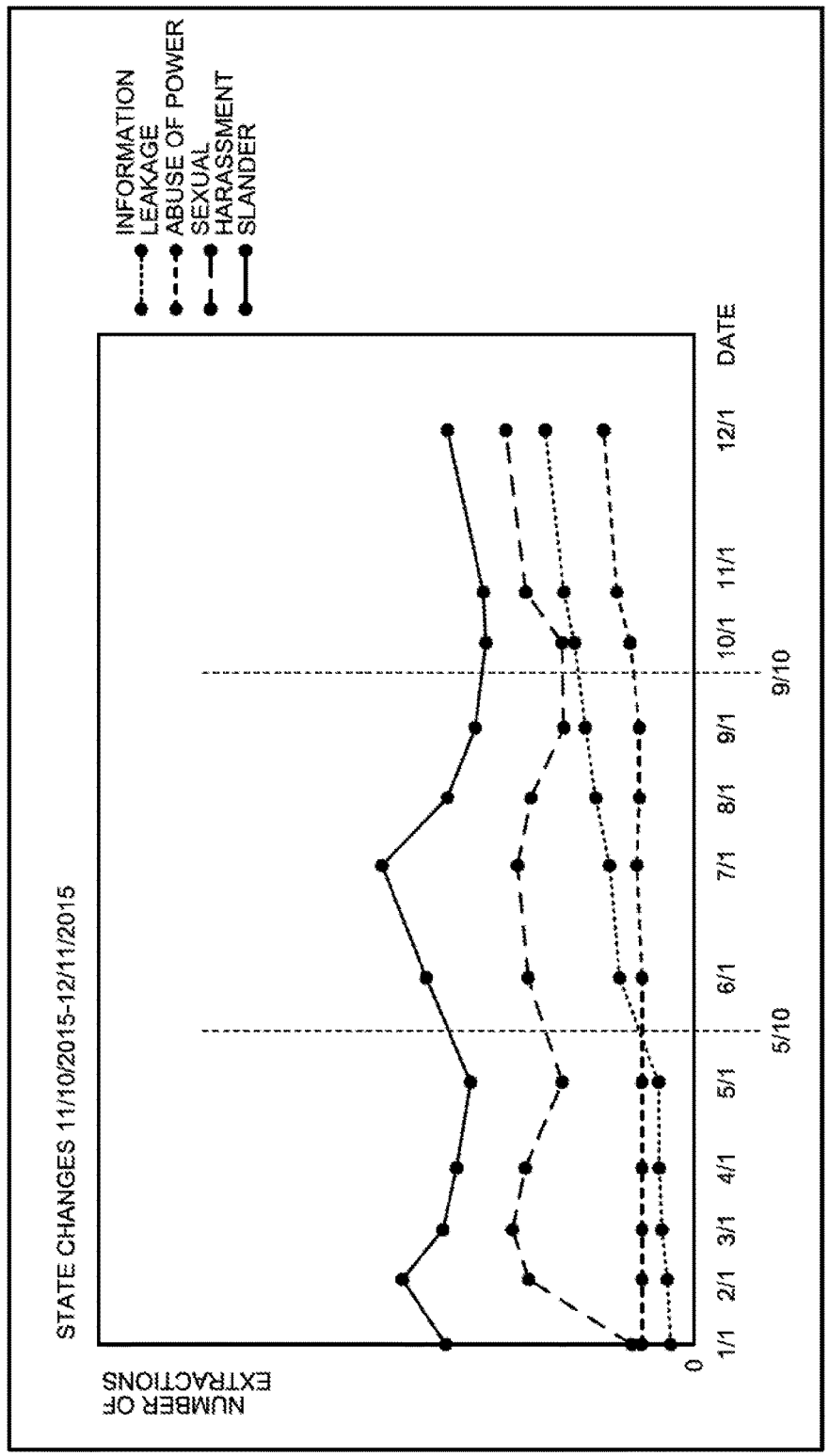
FIG. 19 is a diagram for explaining an example of how to display the transition of extraction before and after update of extraction conditions.

FIG. 19 is a diagram for explaining an example of how to display the transition of extraction before and after update of extraction conditions. As illustrated in FIG. 19, the display control unit 31 displays the date of update of applicable KW, etc. that are the extraction conditions through the learning process described in the first embodiment on the line graph indicating the state transition of the number of extractions in each category (see B in FIG. 14).

In the example of FIG. 19, it is displayed that the extraction conditions were updated on May 10 and September 10. This display enables a user to recognize the transition of the number of extractions before and after the update of the extraction conditions. For example, in the example of FIG. 19, in all the categories, the number of extractions decreases before the update of the extraction conditions, but increases after the update of the extraction conditions. This is because KW used in each category change day by day due to changes of the times and changes in fashion, etc., and also violators are learning every day; therefore, the number of extractions decreases by continuing to use the same conditions for extraction. Accordingly, by updating the conditions for extraction periodically, it is possible to keep up with the violators' learning and expect the improvement in the number of extractions.

Incidentally, if a period before the update of the extraction conditions has been selected, the display control unit 31 can display the extraction conditions before the update; if a period after the update of the extraction conditions has been selected, the display control unit 31 can display the extraction conditions after the update. Furthermore, the display control unit 31 can also display a deleted KW and an added KW in the updated extraction conditions.

Advantageous Effects

The mail server 10 according to the second embodiment can display a result of learning, the risk level, etc., and therefore can recognize the mail sending states of electronic mails violating the compliance and enables the administrator to visually recognize the risk level and dangerous users. Furthermore, the mail server 10 can provide an interface from various points of view, thereby enhancing the convenience.

Moreover, the mail server 10 can display the time for the periodic update of the extraction conditions and the transition of classification together, and therefore can provide an index for determining whether it is keeping up with violators' learning. Consequently, the administrator 5 can reconsider the time to learn, the learning method, etc. and take proactive measures for preventing sending of risky mails.

Furthermore, the mail server 10 can feed back a result of classification, etc. with respect to each mail address, and therefore can improve the morality of employees and assess the morale of employees.

[c] Third Embodiment

The embodiments of the technology discussed herein are explained above; besides the above-described embodiments, the present technology can be embodied in various different forms.

Numerical Values, Classification

The number of classified categories, names of categories, levels of risk, conditions for risk determination, etc. described in the above embodiments can be arbitrarily set and changed. Furthermore, in the second embodiment, line graphs and pie charts are given as an example; however, the forms of graphs or charts are not limited to these, and the other graph forms, such as bar graph, can be adopted. Excludable KW and NG-KW can be set in common by each category.

System

Components of each device illustrated in FIGS. 2 and 11 do not necessarily have to be physically configured as illustrated in the drawings. That is, the components can be configured to be divided or integrated in arbitrary units. For example, the learning unit 24 and the risk determining unit 30 can be integrated into one unit. Furthermore, all or any part of processing functions implemented in each device can be realized by a central processing unit (CPU) and a program analyzed and executed by the CPU, or can be realized as hardware by wired logic.

Moreover, out of the processes described in the present embodiments, all or part of the process described as an automatically-performed process can be manually performed. Or, all or part of the process described as a manually-performed process can be automatically performed by using a known method. Besides, the processing procedures, control procedures, specific names, and information including various data and parameters illustrated in the above description and the drawings can be arbitrarily changed unless otherwise specified.

Hardware

Figure 20:
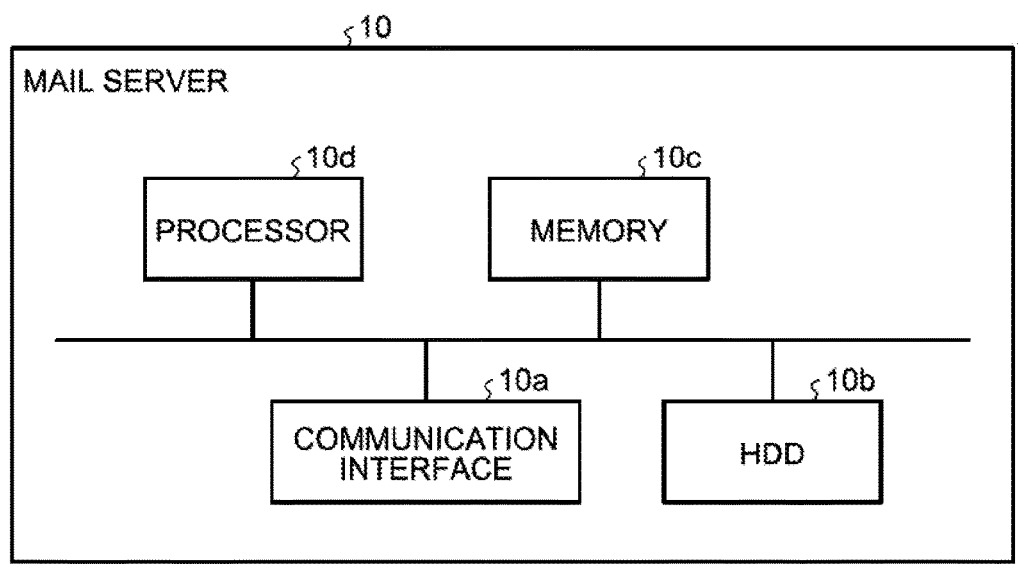
FIG. 20 is a diagram for explaining an example of a hardware configuration.

The mail server 10 can be realized by, for example, a computer having a hardware configuration as described below. FIG. 20 is a diagram for explaining an example of the hardware configuration. As illustrated in FIG. 20, the mail server 10 includes a communication interface 10*a*, a hard disk drive (HDD) 10*b*, a memory 10*c*, and a processor 10*d*.

The communication interface 10*a* is, for example, a network interface card or the like. The HDD 10*b* is a storage device that stores therein the DBs illustrated in FIG. 2, etc.

The memory 10*c* is, for example, a random access memory (RAM) such as a synchronous dynamic random access memory (SDRAM), a read-only memory (ROM), or a flash memory. The processor 10*d* is, for example, a CPU, a digital signal processor (DSP), a field programmable gate array (FPGA), or a programmable logic device (PLD).

The mail server 10 acts as an information processing apparatus that reads out and executes a program thereby implementing a learning method. That is, the mail server 10 executes a program that performs the same functions as the receiving unit 21, the classification determining unit 22, the sending processing unit 23, the learning unit 24, the risk determining unit 30, and the display control unit 31. As a result, the mail server 10 can execute processes that perform the same functions as the receiving unit 21, the classification determining unit 22, the sending processing unit 23, the learning unit 24, the risk determining unit 30, and the display control unit 31. Incidentally, a program according to another embodiment is not limited to be executed by the mail server 10. For example, the technology discussed herein can also be applied to the case where another computer or server executes the program and the case where these two execute the program in cooperation.

This program can be distributed via a network such as the Internet. Furthermore, this program can be recorded on a computer-readable recording medium, such as a hard disk, a flexible disk (FD), a CD-ROM, a magneto-optical disk (MO), or a digital versatile disc (DVD), so that a computer can read out the program from the recording medium and execute the read program.

According to one aspect of the embodiment, it is possible to maintain the accuracy of extracting electronic mails that have a harmful impact.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a learning program that causes a computer to execute a process comprising:

receiving mail from users;

extracting mail from the received mail based on a first keyword set including keywords as an extraction condition;

sending non-extracted mail that is not extracted based on the extraction condition respectively to destination addresses thereof;

storing the extracted mail and the non-extracted mail in a storing unit;

extracting keywords from the extracted mail that are stored in the storing unit;

identifying a keyword as a second keyword set from among the extracted keywords wherein the keyword is not included in the first keyword set, and the keyword appears in mail of a number among the extracted mail, a ratio of the number to a number of the extracted mail being higher than a predetermined threshold; and adding the second keyword set to the first keyword set to obtain a new first keyword set, wherein, when a keyword included in the second keyword set appears in mail of a number among the non-extracted mail, a ratio of the number to a number of the non-extracted mail being higher than a predetermined threshold, the second keyword set is not added to the first keyword set, and the extracting mail includes extracting mail from the received mail based on the new first keyword set.

2. The non-transitory computer-readable recording medium according to claim 1, wherein the process further comprises:

identifying a specific keyword from among the new first keyword set, the specific keyword appearing in mail of a number among the extracted mail, a ratio of the number to a number of the extracted mail being equal to or lower than the predetermined threshold; and controlling either to keep the specific keyword in the new first keyword set or to delete the specific keyword from the new first keyword set according to whether the specific keyword is included in the first keyword set or the second keyword set.

3. The non-transitory computer-readable recording medium according to claim 1, wherein the process further comprises:

extracting a keyword as a third keyword set, the keyword appearing in mail of a number among the non-extracted mail, a ratio of the number to a number of the non-extracted mail being higher than a predetermined threshold; and excluding a keyword included in the third keyword set as a keyword that is added to the first keyword set.

4. A learning method comprising:

receiving mail from users, using a processor;

extracting mail from the received mail based on a first keyword set including keywords as an extraction condition, using the processor;

sending non-extracted mail that is not extracted based on the extraction condition respectively to destination addresses thereof, using the processor;

storing the extracted mail and the non-extracted mail in a storing unit, using the processor;

extracting keywords from the extracted mail that are stored in the storing unit, using the processor;

identifying a keyword as a second keyword set from among the extracted keywords wherein the keyword is not included in the first keyword set, and the keyword appears in mail of a number among the extracted mail, a ratio of the number to a number of the extracted mail being higher than a predetermined threshold, using the processor; and adding the second keyword set to the first keyword set to obtain a new first keyword set, using the processor, wherein, when a keyword included in the second keyword set appears in mail of a number among the non-extracted mail, a ratio of the number to a number of the non-extracted mail being higher than a predetermined threshold, the second keyword set is not added to the first keyword set, and the extracting mail includes extracting mail from the received mail based on the new first keyword set, using the processor.

5. A mail server comprising:

a memory; and a processor coupled to the memory, the processor executing a process including:

receiving mail from users;

extracting mail from the received mail based on a first keyword set including keywords as an extraction condition;

sending non-extracted mail that is not extracted based on the extraction condition respectively to destination addresses thereof;

storing the extracted mail and the non-extracted mail in the memory;

extracting keywords from the extracted mail that are stored in the memory;

identifying a keyword as a second keyword set from among the extracted keywords wherein the keyword is not included in the first keyword set, and the keyword appears in mail of a number among the extracted mail, a ratio of the number to a number of the extracted mail being higher than a predetermined threshold; and adding the second keyword set to the first keyword set to obtain a new first keyword set, wherein, when a keyword included in the second keyword set appears in mail of a number among the non-extracted mail, a ratio of the number to a number of the non-extracted mail being higher than a predetermined threshold, the second keyword set is not added to the first keyword set, and the extracting mail includes extracting mail from the received mail based on the new first keyword set.

6. A non-transitory computer-readable recording medium having stored therein a learning program that causes a computer to execute a process comprising:

receiving mail from users;

extracting mail from the received mail based on a first keyword set including keywords;

sending non-extracted mail that is not extracted based on the first keyword set respectively to destination addresses thereof;

storing the extracted mail and the non-extracted mail in a storing unit;

extracting keywords from the extracted mail that are stored in the storing unit;

classifying the extracted mail that are stored in the storing unit into a plurality of subsets, based on the extracted keywords;

identifying, out of the plurality of subsets, a subset wherein mail included in the subset includes keywords of a number, the keywords being not included in the first keyword set, the number being least among the plurality of subsets; and adding a keyword that is included in mail included in the identified subset and not included in the first keyword set to the first keyword set to obtain a new first keyword set, wherein, when a keyword appears in mail of a number among the non-extracted mail, a ratio of the number to a number of the non-extracted mail being higher than a predetermined threshold, the keyword is not added to the first keyword set, and the extracting mail includes extracting mail from the received mail based on the new first keyword set.

7. A learning method comprising:

receiving mail from users, using a processor;

extracting mail from the received mail based on a first keyword set including keywords, using the processor;

sending non-extracted mail that is not extracted based on the first keyword set respectively to destination addresses thereof, using the processor;

storing the extracted mail and the non-extracted mail in a storing unit, using the processor;

extracting keywords from the extracted mail that are stored in the storing unit, using the processor;

classifying the extracted mail that are stored in the storing unit into a plurality of subsets, based on the extracted keywords, using the processor;

identifying, out of the plurality of subsets, a subset wherein mail included in the subset includes keywords of a number, the keywords being not included in the first keyword set, the number being least among the plurality of subsets, using the processor; and adding a keyword that is included in mail included in the identified subset and not included in the first keyword set to the first keyword set to obtain a new first keyword set, using the processor, wherein, when a keyword appears in mail of a number among the non-extracted mail, a ratio of the number to a number of the non-extracted mail being higher than a predetermined threshold, the keyword is not added to the first keyword set, and the extracting mail includes extracting mail from the received mail based on the new first keyword set, using the processor.

8. A mail server comprising:

a memory; and a processor coupled to the memory, the processor executing a process including:

receiving mail from users;

extracting mail from the received mail based on a first keyword set including keywords;

sending non-extracted mail that is not extracted based on the first keyword set respectively to destination addresses thereof;

storing the extracted mail and the non-extracted mail in the memory;

extracting keywords from the extracted mail that are stored in the memory;

classifying the extracted mail that are stored in the memory into a plurality of subsets, based on the extracted keywords;

identifying, out of the plurality of subsets, a subset wherein mail included in the subset includes keywords of a number, the keywords being not included in the first keyword set, the number being least among the plurality of subsets; and adding a keyword that is included in mail included in the identified subset and not included in the first keyword set to the first keyword set to obtain a new first keyword set, wherein, when a keyword appears in mail of a number among the non-extracted mail, a ratio of the number to a number of the non-extracted mail being higher than a predetermined threshold, the keyword is not added to the first keyword set, and the extracting mail includes extracting mail from the received mail based on the new first keyword set.

* * * * *